United States Patent [19]
Tokuhashi et al.

[11] Patent Number: 5,838,432
[45] Date of Patent: Nov. 17, 1998

[54] OPTICAL ANGLE DETECTION APPARATUS

[75] Inventors: Yuki Tokuhashi; Yoichi Iba, both of Hachioji; Toshiro Okamura; Seiichiro Tabata, both of Hino, all of Japan

[73] Assignee: Olympus Optical Co., Ltd., Tokyo, Japan

[21] Appl. No.: 659,220

[22] Filed: Jun. 7, 1996

[30] Foreign Application Priority Data

Jun. 12, 1995 [JP] Japan .................................. 7-144772

[51] Int. Cl.$^6$ ................................................. G01B 11/26
[52] U.S. Cl. .................................. 356/139.03; 356/141.3
[58] Field of Search ............................ 356/139.03, 140, 356/141.2, 141.3, 141.5

[56] References Cited

U.S. PATENT DOCUMENTS

| | | |
|---|---|---|
| 3,474,255 | 10/1969 | White . |
| 3,932,039 | 1/1976 | Frey . |
| 4,682,024 | 7/1987 | Halldorsson et al. ............ 356/152 |
| 4,769,531 | 9/1988 | Malek ............................. 250/203 R |
| 4,923,303 | 5/1990 | Lutz ................................. 356/375 |
| 4,944,588 | 7/1990 | Köhler ............................. 356/152 |
| 5,059,789 | 10/1991 | Salcudean ........................ 250/206.1 |

FOREIGN PATENT DOCUMENTS

| | | |
|---|---|---|
| 51-41544 | 4/1976 | Japan . |
| 61-142085 | 6/1986 | Japan . |
| 7-26840 | 3/1995 | Japan . |
| 7-318332 | 12/1995 | Japan . |
| 2 289 756 | 11/1995 | United Kingdom . |

*Primary Examiner*—Mark Hellner
*Attorney, Agent, or Firm*—Frishauf, Holtz, Goodman, Langer & Chick

[57] ABSTRACT

An optical angle detection apparatus includes a light source section, a sensor section disposed separately from the light source section through a space, a timing controller, and a calculation processing section. The light source section includes a plurality of LEDs and a plurality of first polarizing plates whose polarizing directions differ from each other by 45° in correspondence with the LEDs. The sensor section includes a lens and a two-dimensional PSD. The timing controller sequentially and periodically turns on the plurality of LEDs. The calculation processing section calculates the angle of the light source section relative to the sensor section around an axis determined by the light source section and the inclination angles of the sensor section in two axial directions with respect to the optical axis of the light source section on the basis of an output from the two-dimensional PSD which changes in accordance with the amount of light incident from the light source section onto the sensor section and the coordinates of an incident spot.

8 Claims, 14 Drawing Sheets

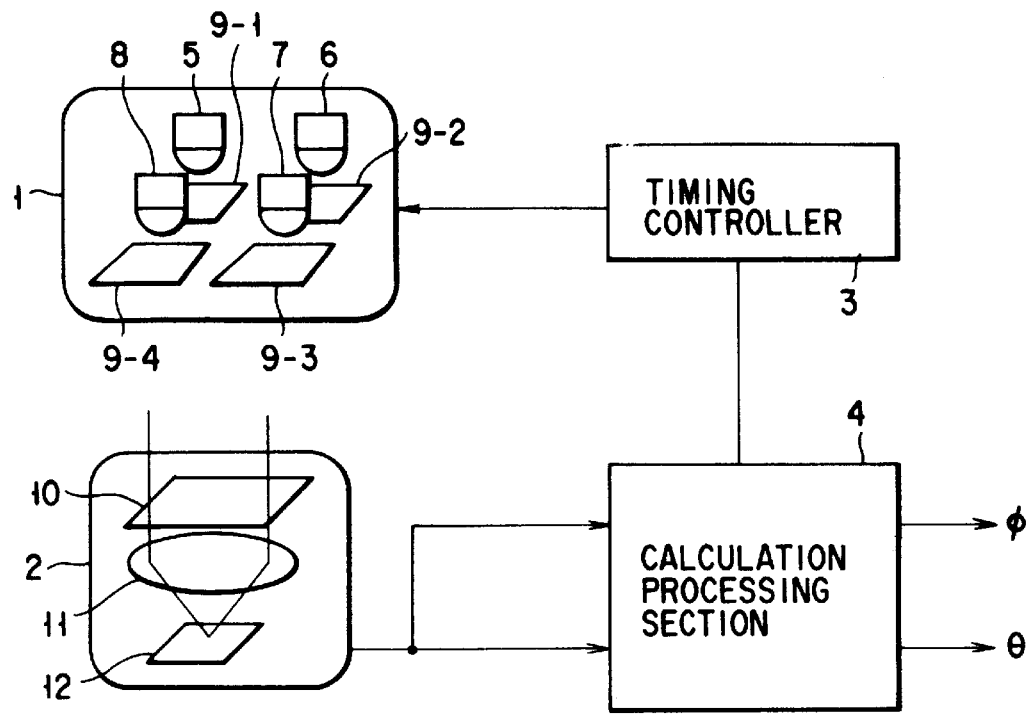
FIG. 1A
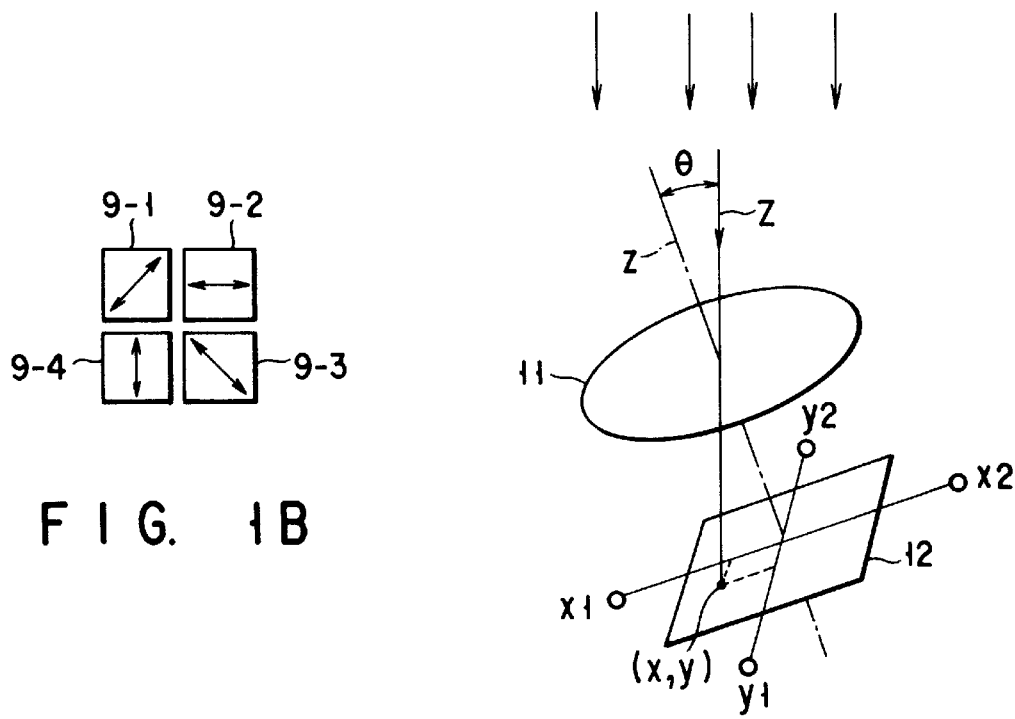
FIG. 1B
FIG. 2

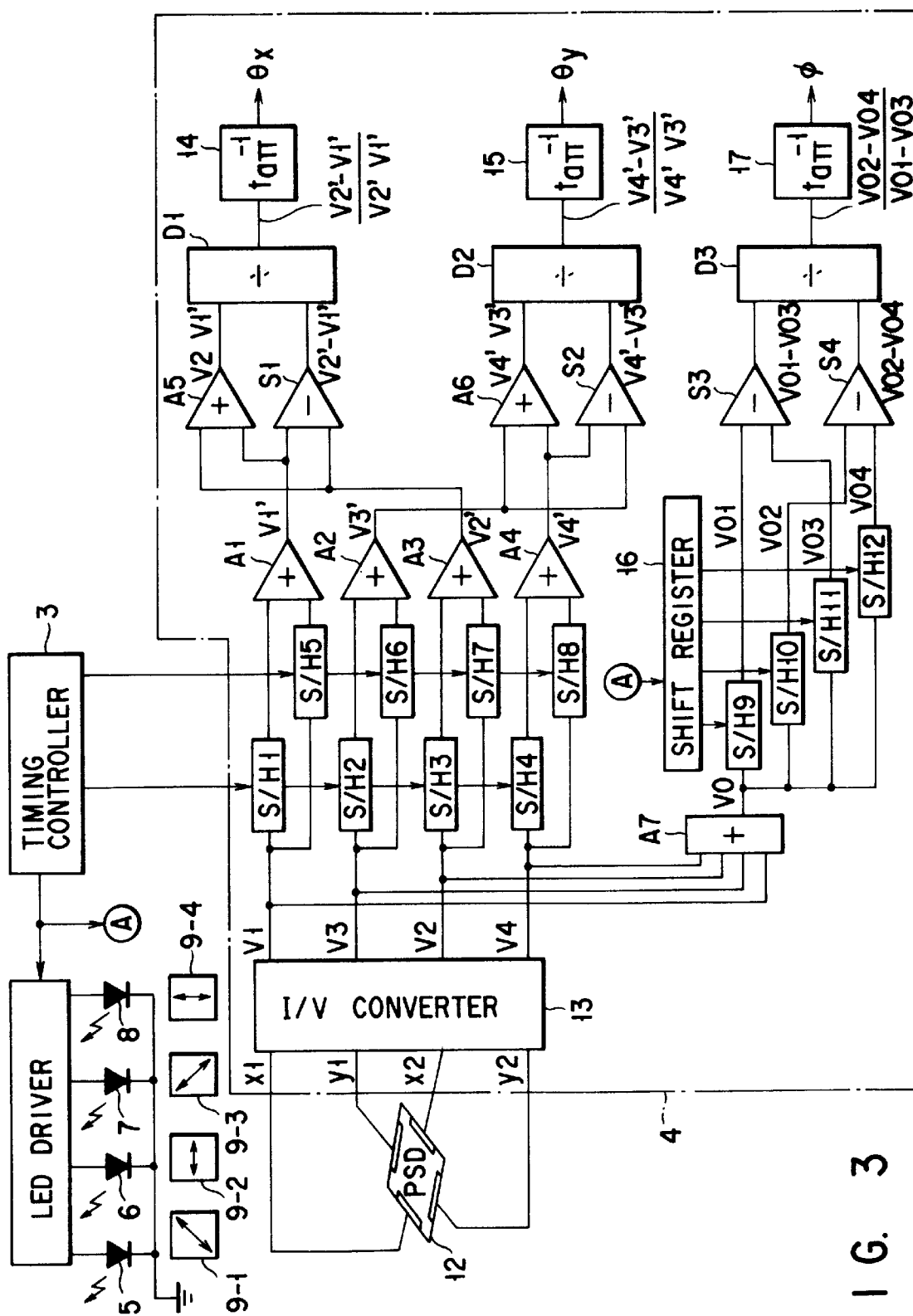
F I G. 3

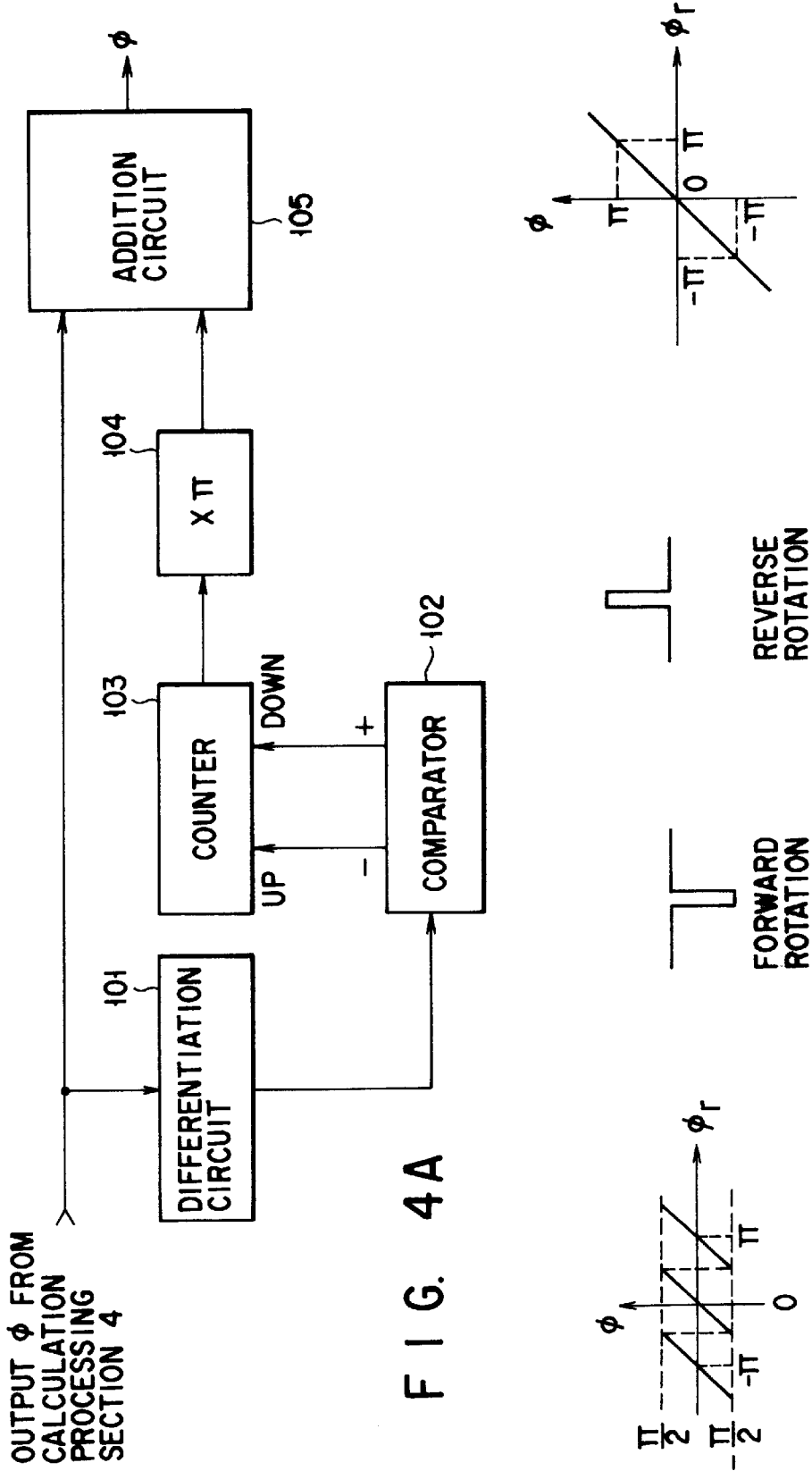

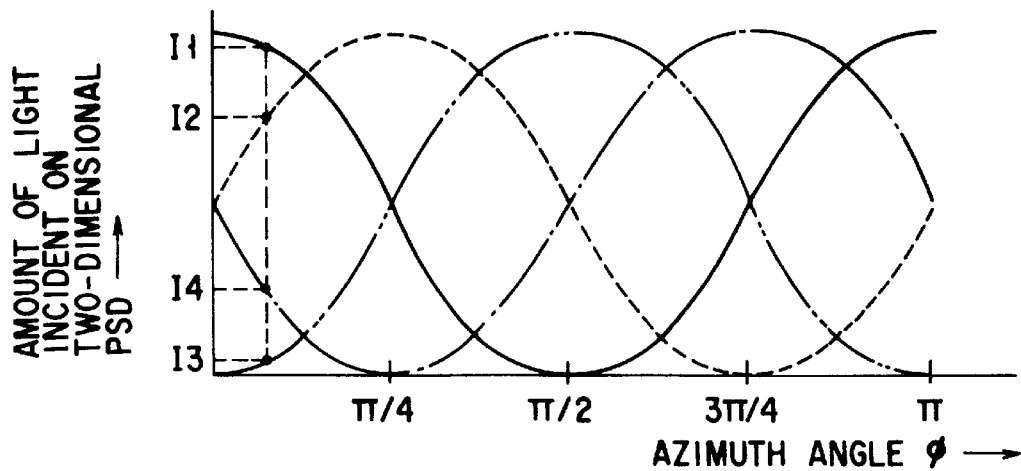
F I G. 6
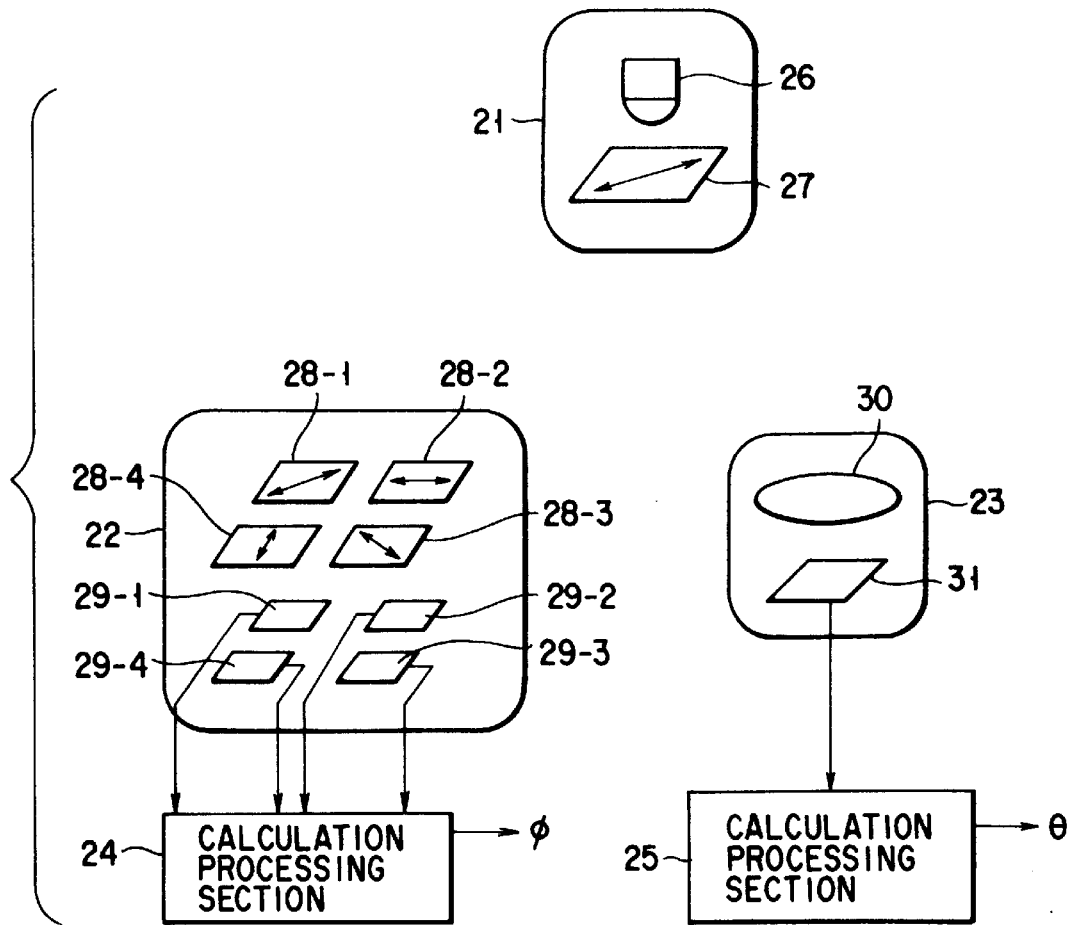
F I G. 7

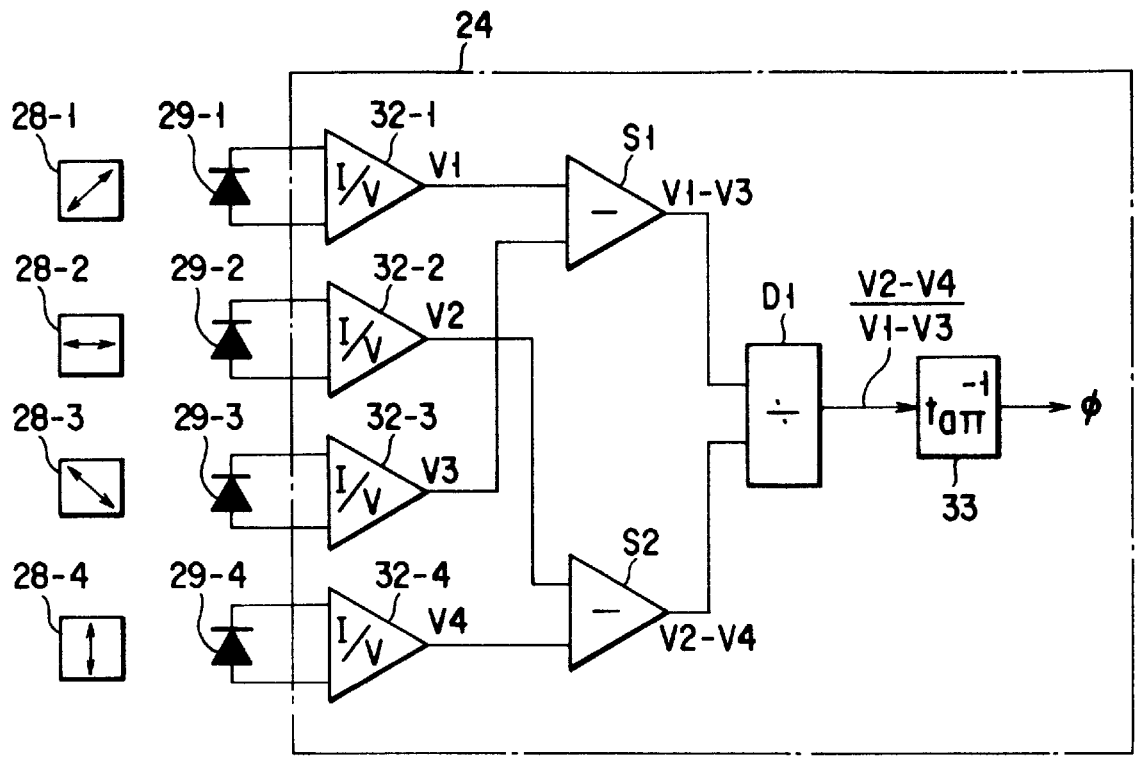
F I G. 8
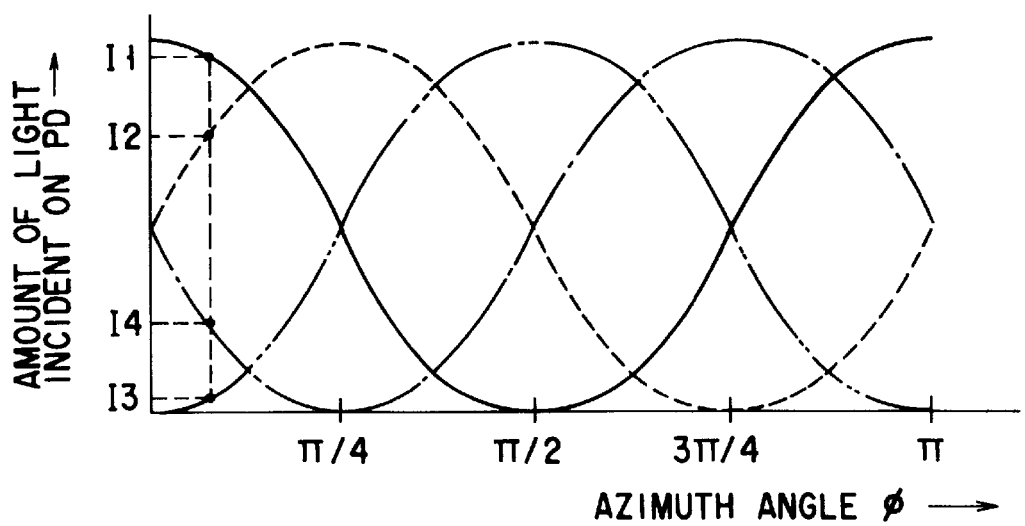
F I G. 9

| TIME | t0+nT/4 | t0+(n+1)T/4 | t0+(n+2)T/4 | t0+(n+3)T/4 |
|---|---|---|---|---|
| π/4 CELL | ON | OFF | ON | OFF |
| π/2 CELL | ON | ON | OFF | OFF |
| ROTATION ANGLE IN POLARIZING DIRECTION | 0° | 45° | 90° | 135° |

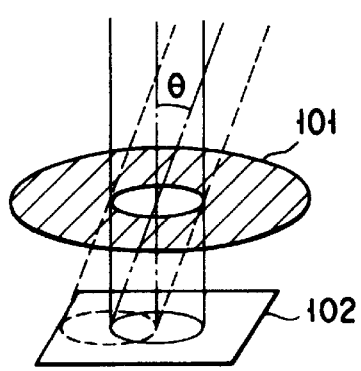
F I G. 16
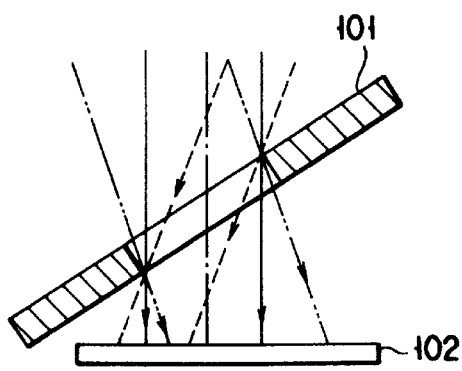
F I G. 17
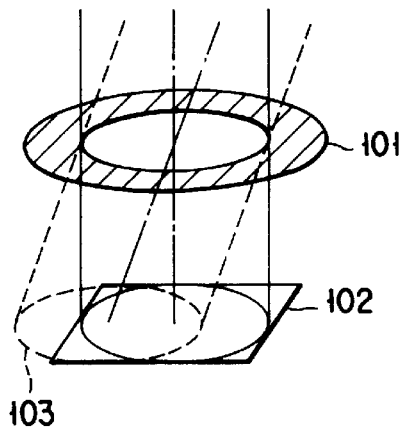
F I G. 18A
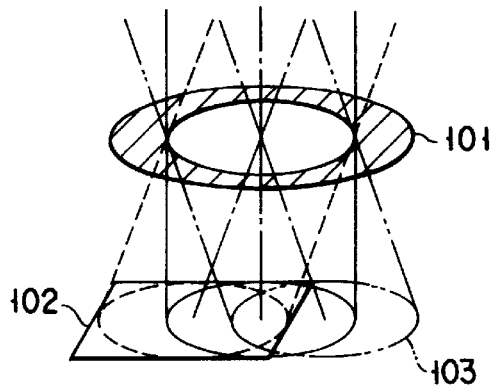
F I G. 18B
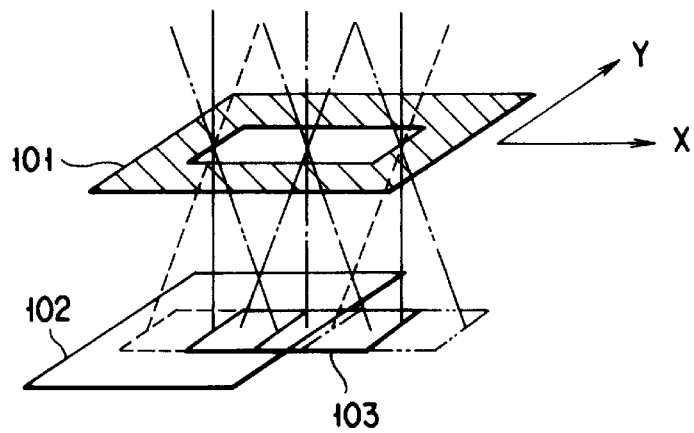
F I G. 19

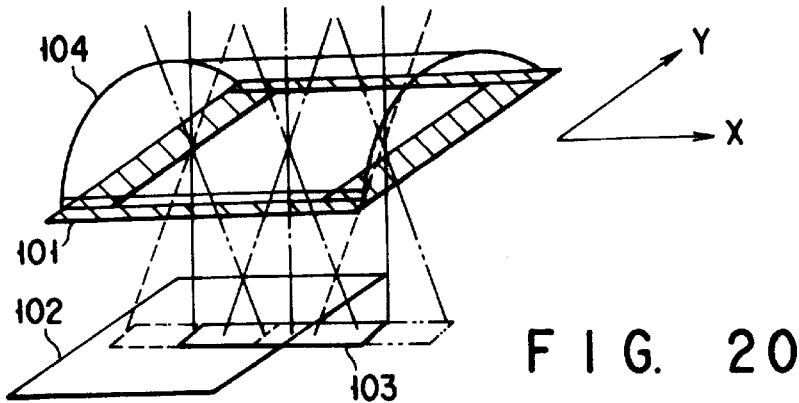
F I G. 20
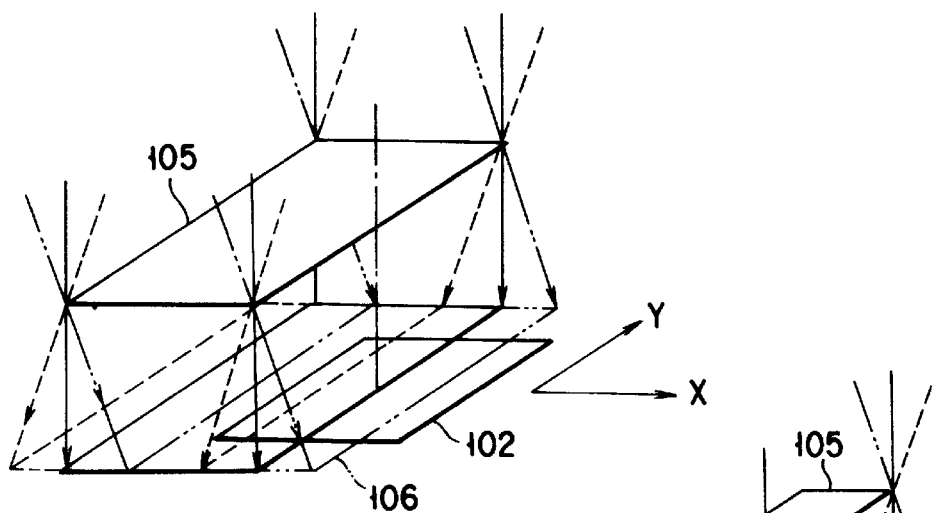
F I G. 21A
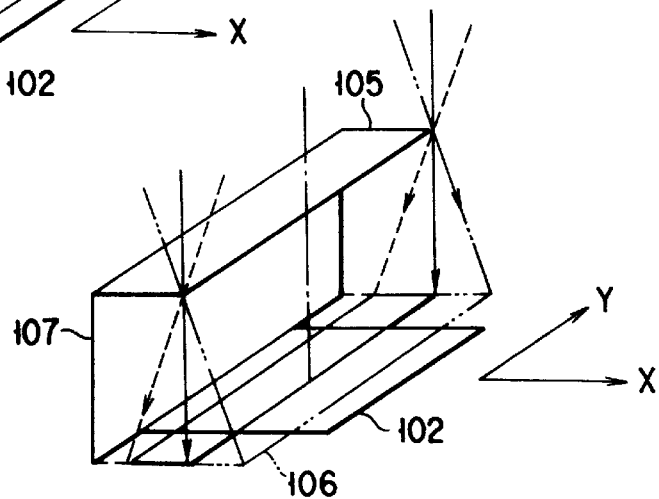
F I G. 21B
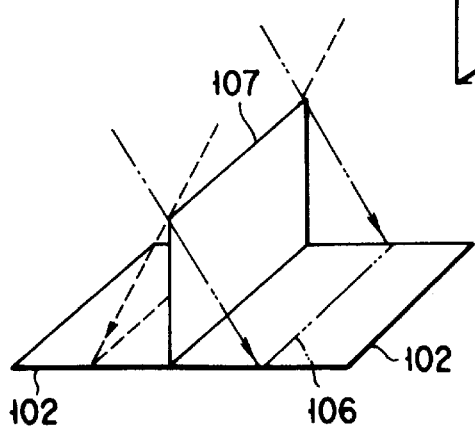
F I G. 21C

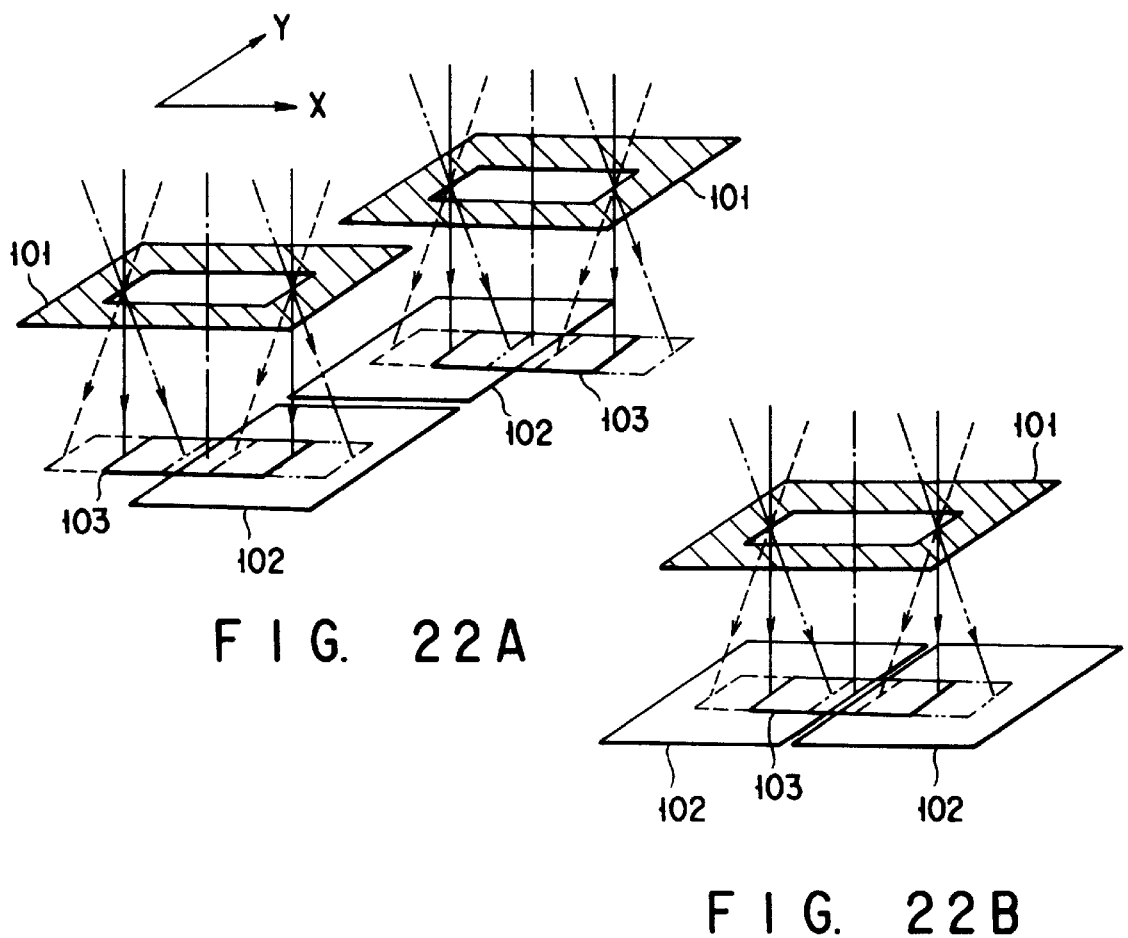
F I G. 22A
F I G. 22B
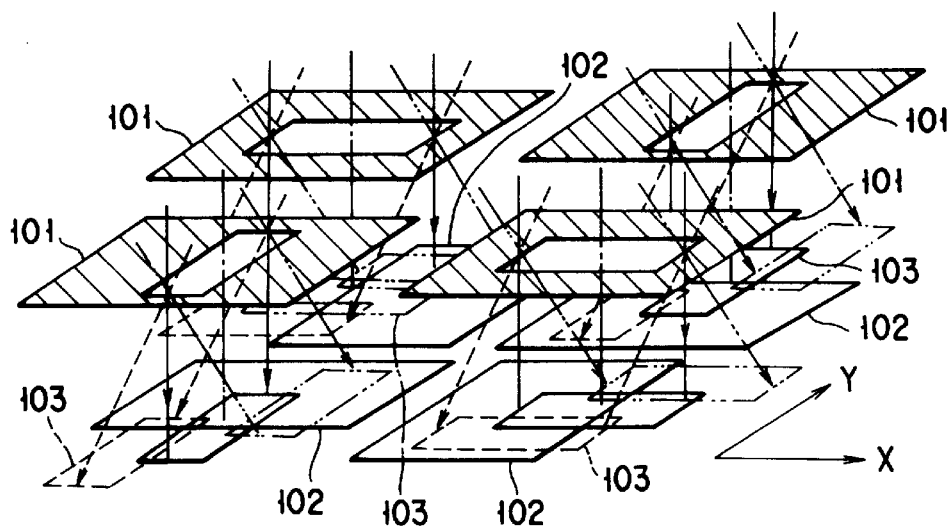
F I G. 23

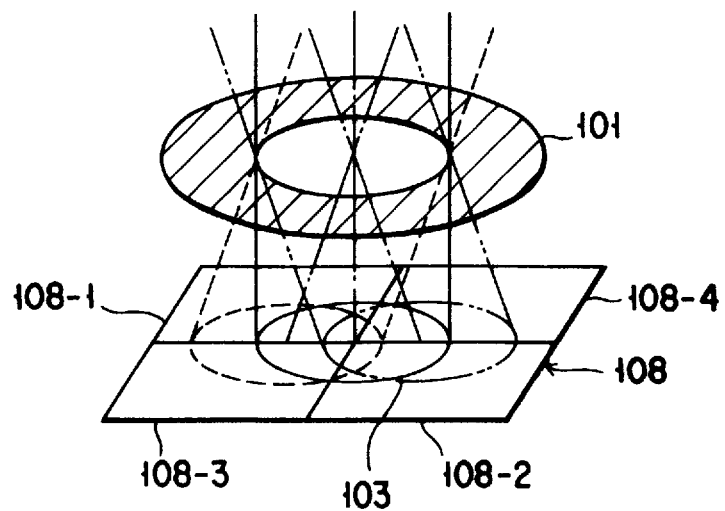
F I G. 24
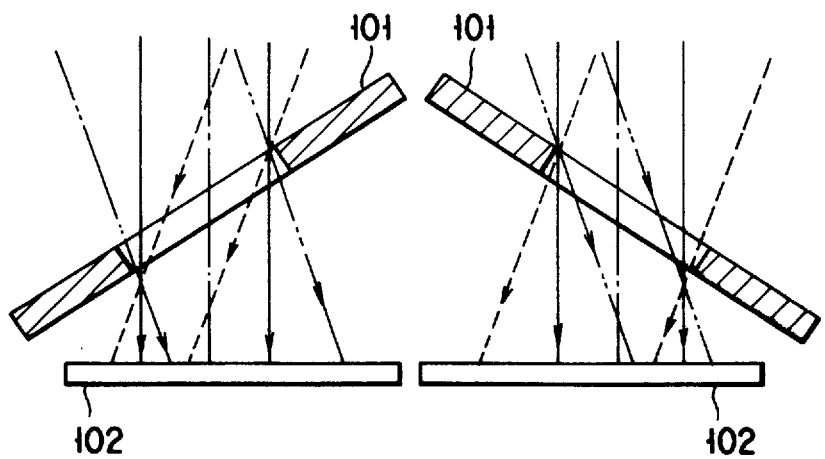
F I G. 25

OPTICAL ANGLE DETECTION APPARATUS

BACKGROUND OF THE INVENTION

1. Field of the Invention

The present invention relates to an optical angle detection apparatus for detecting rotation angles in one to three axial directions in a predetermined coordinate system and, more particularly, to an optical angle detection apparatus which is designed to detect the back-and-forth and lateral inclination angles and horizontal rotation angle (azimuth) of the head of a user for use in performing a control operation to change an image displayed on a head mounting image display apparatus, or to remotely control an image supply apparatus such as a video camera, and the like.

2. Description of the Related Art

As is known, for example, in displaying a virtual reality (VR) image as a display image, a user having a head mounting image display apparatus (HMD) mounted thereon can selectively observe a desired display image by inclining his or her head back and forth or right and left, and/or by rotating his or her head right and left in the horizontal direction.

A detection apparatus for detecting the movement of the head of the user is required for an HMD system for changing such display image in accordance with the movement of the head of the user.

In a system in which an operator performs remote control of an object to be controlled while an image of the object picked up by an ITV camera is monitored, in order to obtain a desired display image of the object by performing remote control of the ITV camera in accordance with the movement of the head of the operator, a detection apparatus for detecting the movement of the head of the operator is required.

Owing to this necessity, various detection apparatuses (motion sensors) designed for detection of a moving object (e.g., the head of a user) have been proposed.

For example, a detection apparatus is disclosed in Jpn. Pat. Appln. KOKAI Publication No. 51-41544. In this apparatus, non-polarized pulse light from a pulse light source designed to switch light intensities between 0 and a predetermined value is incident on a plurality of (e.g., two) second polarizing means through a first polarizing means, and light emerging from each second polarizing means is detected by a photosensitive means, thereby obtaining rotation angles between the first polarizing means and the plurality of second polarizing means on the basis of the amplitude ratios between output signals from the photosensitive means.

This detection apparatus can detect rotation angles in one axial direction.

Note that this detection apparatus performs a special process to cancel an offset component in an angle detecting operation.

For example, FIG. 2 shows the principle of a detection apparatus for detecting rotation angles in two axial directions.

This detection apparatus is constituted by a lens 11 on which substantially collimated light from a remote light source (e.g., the sun (not shown)) is incident, and a two-dimensional position sensor (PSD) 12 on which a light beam emerging from the lens 11 is incident. This two-dimensional PSD 12 is integrally fixed to the lens 11.

In this detection apparatus, when an optical axis z of a system including the lens 11 and the two-dimensional PSD 12 inclines an angle θ with respect to an optical axis (e.g., a vertical axis) Z of substantially collimated light, the incident position of spot light on the two-dimensional PSD 12 is determined by the angle θ. For this reason, the center coordinates (x,y) of the incident spot light are obtained from outputs x1, x2, y1, and y2 from the two-dimensional PSD 12, and x- and y-components θx and θy of the angle θ can be obtained from the obtained coordinates.

As a detection apparatus for detecting rotation angles (or corresponding physical quantities) in three axial directions, an apparatus using a piezoelectric vibration gyro used for image blur prevention in a video camera and the like is available.

In this case, since rotation angles are sequentially calculated on the basis of angular velocities, if a detection apparatus is constituted by only a gyro sensor, for example, the following problems are posed: (1) detection errors tend to accumulate; and (2) the output of the apparatus becomes unstable and discontinuous because of drifts in the gyro sensor.

In general, therefore, such an apparatus also uses a reference GPS or ultrasonic sensor.

Assume that a detection apparatus is constituted by combinations of gyro sensors and GPSs or ultrasonic sensors. In this case, since three sets of expensive gyro sensors and other sensors are used to detect movements in three axial directions, the cost and size of the apparatus increase. In addition, since it takes much time to calculate the above rotation angles, the follow-up characteristics deteriorate.

For this reason, a detection apparatus using optical sensors (photosensors) as relatively inexpensive sensors instead of gyro sensors is disclosed in, e.g., Jpn. Pat. Appln. KOKAI Publication No. 61-142085.

According to this prior art, LEDs as light sources are mounted on the upper and rear head portions of the operator, and two-dimensional position detectors (PSDs) are arranged at the upper and rear sides of the head portions to oppose these LEDs. The back-and-forth and lateral movements of the head are detected by the LED-PSD set on the upper portion of the head of the operator, and the vertical and lateral movements of the head are detected by the LED-PSD set on the rear portion of the head of the operator, thereby detecting three-dimensional movements of the head on the basis of information obtained by the two LED-PSD sets.

In this prior art, although a positional shift of each LED due to the movement of the head is detected, rotation angles in three axial directions in a predetermined coordinate system are not directly detected.

As described above, in the prior art, the response speed of each gyro itself is not high, and signal processing is performed using various types of sensors to correct instability which may be caused by drifts, resulting in a deterioration in follow-up characteristics.

In addition, since the detection apparatus disclosed in Jpn. Pat. Appln. KOKAI Publication No. 51-41544 uses a complicated signal processing system, the detection apparatus becomes expensive.

The detection apparatus disclosed in Jpn. Pat. Appln. KOKAI Publication No. 61-142085 uses two two-dimensional position detectors each having an arrangement like the one shown in FIG. 2, which are relatively expensive among optical sensors.

This detection apparatus as a single unit is inexpensive as compared with the detection apparatus using the above gyro sensor and the like. However, since a plurality of such apparatuses are required, as shown in FIG. 2, the overall apparatus becomes expensive.

SUMMARY OF THE INVENTION

It is, therefore, an object of the present invention to provide a new and improved optical angle detection apparatus which has a high response speed, which generates very few detection errors which does not require that various types of sensors be used together, and which has good follow-up characteristics, all at a low cost.

According to the first aspect of the present invention, there is provided an inexpensive optical angle detection apparatus for detecting a rotation angle in one axial direction in a predetermined coordinate system.

According to the second aspect of the present invention, there is provided an inexpensive optical angle detection apparatus which uses the most inexpensive one-dimensional position sensor, photodetector, or the like in place of an expensive two-dimensional position sensor, and detects rotation angles in two axial directions in a predetermined coordinate system.

According to the third aspect of the present invention, there is provided an inexpensive optical angle detection apparatus for detecting rotation angles in three axial directions in a predetermined coordinate system.

According to one aspect of the present invention, there is provided an optical angle detection apparatus comprising a plurality of focusing optical systems on which substantially collimated light is incident, and a sensor section having a one-dimensional position sensor integrally fixed to each of the focusing optical systems, wherein rotation angles in two and three axial directions in a predetermined coordinate system are detected.

According to the arrangement of this optical angle detection apparatus, each of the focusing optical system focuses the substantially collimated light incident thereon into a linear spot, and the linear spot crosses the one-dimensional position sensor integrally fixed to the focusing optical system at a position dependent on the incident angle of the substantially collimated light incident on the focusing optical system.

If, for example, two focusing optical systems are used, a rotation angle in one axial direction in a predetermined coordinate system (e.g., an inclination angle in one axial direction in a sensor section coordinate system with respect to the optical axis of substantially collimated light) is detected on the basis of an output from one one-dimensional position sensor, and a rotation angle in another one axial direction (e.g., an inclination angle in another axial direction in the sensor section coordinate system with respect to the optical axis of substantially collimated light) is detected on the basis of an output from the other one-dimensional position sensor, thereby obtaining rotation angles in two axial directions in the predetermined coordinate system.

According to another aspect of the present invention, there is provided an optical angle detection apparatus comprising light source means including not less than three polarized light sources having different polarizing directions, and a sensor section disposed separately from the light source means through a space and including polarizing means for polarizing a light beam from the light source means, and a photosensor integrally fixed to the polarizing means.

According to the arrangement of this optical angle detection apparatus, light beams from the three or more polarized light sources having different polarizing directions and included in the light source means are incident on the sensor section disposed separately from the light source means through a space. In the sensor section, the amount of light dependent on the angle defined by the polarizing direction of each polarized light source and the direction of the axis of polarization of the polarizing means is transmitted through or reflected by the polarizing means to be incident on a corresponding photosensor integrally fixed to the polarizing means.

In this case, a rotation angle in one axial direction in a predetermined coordinate system, i.e., the angle of the light source means relative to the sensor section around the axis determined by the light source means or the sensor section, is detected on the basis of an output from the photosensor which varies depending on one of the three or more polarized light source from which the light beam is incident.

According to still another aspect of the present invention, there is provided an optical angle detection apparatus comprising light source means including not less than three polarized light sources having different polarizing directions, and a sensor section disposed separately from the light source means through a space and including polarizing means for polarizing a light beam from the light source means, and a two-dimensional position sensor integrally fixed to the polarizing means.

According to the arrangement of this optical angle detection apparatus, light beams from the three or more polarized light sources having different polarizing directions and included in the light source means are incident on the sensor section disposed separately from the light source means through a space. In the sensor section, the amount of light dependent on the angle defined by the polarizing direction of each polarized light source and the direction of the axis of polarization of the polarizing means is transmitted through or reflected by the polarizing means to be incident on a corresponding two-dimensional position sensor integrally fixed to the polarizing means.

In this case, a rotation angle in one axial direction in a predetermined coordinate system, i.e., the angle of the light source means relative to the sensor section around the axis determined by the light source means or the sensor section, is detected on the basis of an output from the two-dimensional position sensor which varies depending on one of the three or more polarized light source from which the light beam is incident.

In addition, rotation angles in two axial directions in a predetermined coordinate system, e.g., the inclination angles of the sensor section in two axial directions with respect to the optical axis of the light source means, are detected on the basis of at least one of two-dimensional position sensor outputs corresponding to the coordinates of the incident spots of light beams from the three or more polarized light sources.

According to still another aspect of the present invention, there is provided an optical angle detection apparatus comprising not less than three polarizing means arranged at incident positions of polarized light beams and having axes of polarization different from each other, and a sensor section having a photosensor integrally fixed to each of the polarizing means.

According to the arrangement of this optical angle detection apparatus, when polarized light beams are incident on the three or more polarizing means of the sensor section, the amount of incident light dependent on the angle defined by the polarizing direction of each polarized light beam and the direction of the axis of polarization of each polarizing means is transmitted through or reflected by the polarizing means to be incident on a corresponding photosensor integrally fixed to the polarizing means.

A rotation angle in one axial direction in a predetermined coordinate system, e.g., the angle of the sensor section around the optical axis of the polarized light beam or the axis determined by the sensor section, is detected on the basis of an output from each photosensor.

According to still another aspect of the present invention, there is provided an optical angle detection apparatus comprising a light source for emitting polarized light, light source means having a liquid crystal member for changing a polarizing direction of the light source by a predetermined angle, a sensor section disposed separately from the light source means through a space and including a polarizing member for polarizing a light beam from the light source means, and a photosensor integrally fixed to the polarizing member, and a control mechanism for applying a predetermined voltage, which changes with time, to the liquid crystal member.

According to the arrangement of this optical angle detection apparatus, when a voltage which changes with time is applied from the control mechanism to the liquid crystal member for changing the polarizing direction of the light source by a predetermined angle, the polarizing direction of polarized light emitted from the light source of the light source means is changed by the predetermined angle with time while the light is transmitted through the liquid crystal member, and the resultant light is incident on the polarizing member of the sensor section disposed separately from the light source means through a space.

The amount of light corresponding to the angle defined by the changed polarizing direction and the direction of the axis of polarization of the polarizing member is transmitted through or reflected by the polarizing member to be detected by the photosensor. Therefore, the angle of the light source means relative to the sensor section around the axis determined by the light source means or the sensor section is detected on the basis of an output from the photosensor which changes with time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given blow, serve to explain the principles of the invention.

FIG. 1A is a block diagram showing an optical angle detection apparatus according to the first embodiment of the present invention;

FIG. 1B is a view showing the polarizing directions of polarizing plates used in the first embodiment of the present invention;

FIG. 2 is a view for explaining the principle of an angle detecting operation in a conventional apparatus and the optical angle detection apparatus according to the first embodiment of the present invention;

FIG. 3 is a circuit diagram for explaining signal detection and calculation processing in the angle detection apparatus according to the first embodiment of the present invention;

FIGS. 4A to 4E are a block diagram and timing charts for explaining an example of the result obtained by performing phase processing of an output signal from a calculation processing section of the optical angle detection apparatus according to the first embodiment of the present invention;

FIG. 6 is a graph showing output waveforms from a two-dimensional position detector (PSD) of the optical angle detection apparatus according to the first embodiment of the present invention;

FIG. 7 is a block diagram showing an optical angle detection apparatus according to the second embodiment of the present invention;

FIG. 8 is a circuit diagram for explaining signal detection and calculation processing in the optical angle detection apparatus according to the second embodiment of the present invention;

FIG. 9 is a graph showing output waveforms from a photosensor (PD) of the optical angle detection apparatus according to the second embodiment of the present invention;

FIG. 16 is a view showing another arrangement of a second sensor section of the optical angle detection apparatus of the present invention;

FIG. 17 is a view showing still another arrangement of the second sensor section of the optical angle detection apparatus of the present invention;

FIGS. 18A and 18B are views showing still another arrangement of the second sensor section of the optical angle detection apparatus of the present invention;

FIG. 19 is a view showing still another arrangement of the second sensor section of the optical angle detection apparatus of the present invention;

FIG. 20 is a view showing still another arrangement of the second sensor section of the optical angle detection apparatus of the present invention;

FIGS. 21A, 21B, and 21C are views each showing still another arrangement of the second sensor section of the optical angle detection apparatus of the present invention;

FIGS. 22A and 22B are views each showing still another arrangement of the second sensor section of the optical angle detection apparatus of the present invention;

FIG. 23 is a view showing still another arrangement of the second sensor section of the optical angle detection apparatus of the present invention;

FIG. 24 is a view showing still another arrangement of the second sensor section of the optical angle detection apparatus of the present invention; and FIG. 25 is a view showing still another arrangement of the second sensor section of the optical angle detection apparatus of the present invention.

DETAILED DESCRIPTION OF THE PREFERRED EMBODIMENTS

Figures 5A, 5B:
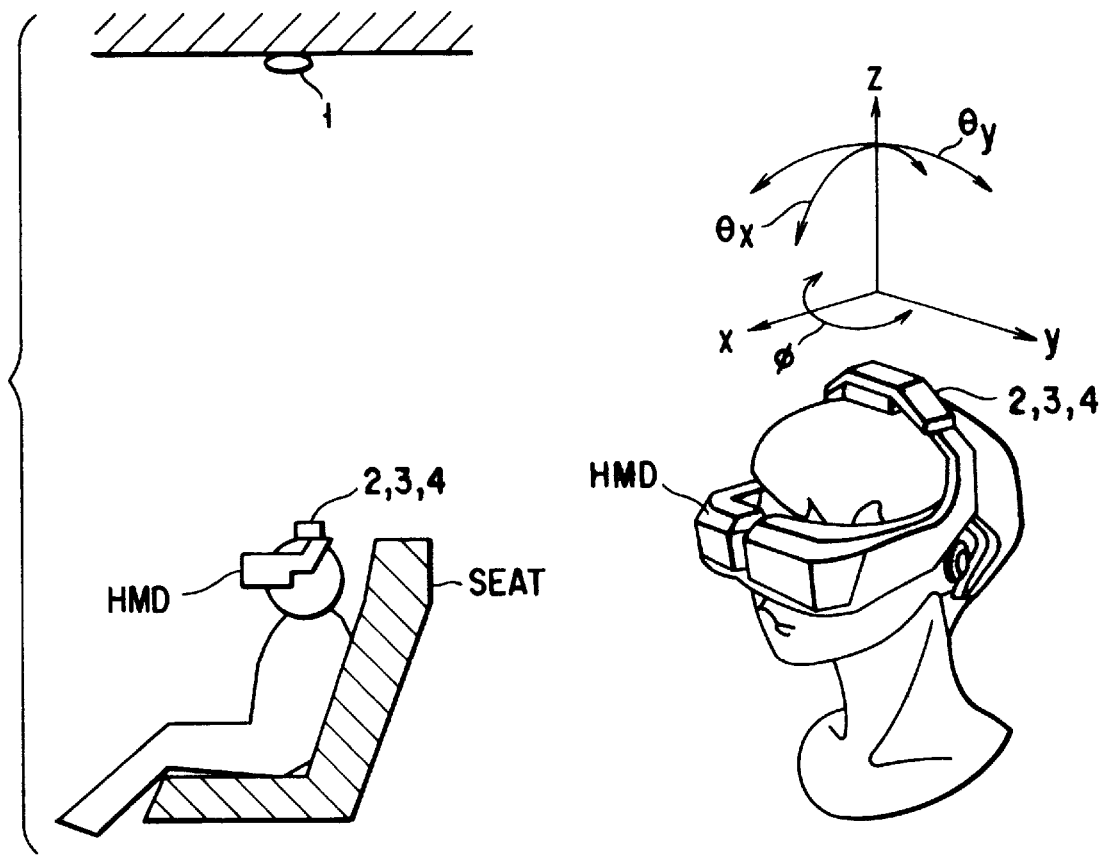
FIG. 5A is a view showing an example of how the optical angle detection apparatus according to the first embodiment of the present invention is used.
FIG. 5B is a perspective view showing an example of the optical angle detection apparatus according to the first embodiment of the present invention.

Reference will now be made in detail to the presently preferred embodiments of the invention as illustrated in the accompanying drawings, in which like reference characters designate like or corresponding parts throughout the several drawings.

Embodiments of the present invention will be described below with reference to the accompanying drawings.

FIG. 1A is a block diagram showing an optical angle detection apparatus according to the first embodiment of the present invention.

The optical angle detection apparatus of this embodiment comprises a light source section 1, a sensor section 2, a control section 3, and a calculation processing section 4.

FIG. 5A shows an example of how the apparatus is used. As shown in FIG. 5A, the light source section 1 is fixed to a ceiling, the distal end of a tall pole, or the like.

The sensor section 2 is mounted on the upper portion of a head mounting display apparatus (to be referred to as an HMD hereinafter) or fixed to the upper portion of the head of the user of the HMD through a mounting means.

The user takes a predetermined seat, and a game image or the like is displayed on the screen of the HMD.

When the sensor section 2 is to be mounted on the upper portion of the HMD, for example, an HMD system has an arrangement like the one shown in FIG. 5B.

Note that the control section 3 and the calculation processing section 4 may be arranged inside or outside the HMD.

As shown in FIG. 1A, the light source section 1 is constituted by LEDs 5 to 8 as light sources and first polarizing plates 9-1 to 9-4 corresponding to the LEDs.

The LEDs 5 to 8 are sequentially (in the order of the LEDs 5, 6, 7, and 8) and periodically turned on by signals from the timing controller 3 as the control section.

Each of the LEDs 5 to 8 may be constituted by a plurality of LEDs.

As shown in FIG. 1B, the first polarizing plates 9-1 to 9-4 are arranged such that their axes of polarization are set at 45°-angular intervals.

The arrangement of the respective polarizing plates is not limited to the one shown in FIG. 1B, and another arrangement may be used.

The sensor section 2 is constituted by a second polarizing plate 10, a lens (focusing optical system) 11, and a two-dimensional sensor (two-dimensional PSD) 12.

This two-dimensional sensor 12 is integrally fixed to the lens 11 to be almost located at the focal position of the lens 11.

An angle detecting operation of this embodiment will be described next with reference to the principle shown in FIG. 2.

Light beams emitted from the LEDs 5 to 8 of the light source section 1 are linearly polarized by the first polarizing plates 9-1 to 9-4 in different directions to be incident, as substantially collimated light, on the sensor section 2. Part of the light is transmitted through the second polarizing plate 10 and focused on the two-dimensional sensor 12 by the lens 11.

If the light source section 1 is set at a sufficiently remote place, the incident position of spot line on the two-dimensional PSD 12 is determined by the incident angle of the light on the lens 11, i.e., an inclination angle θ of an optical axis z of the system including the lens 11 and the two-dimensional PSD 12 with respect to an optical axis (e.g., a vertical axis) Z of substantially collimated light, as shown in FIG. 2.

Letting θx be the inclination angle in the x direction, θy be the inclination angle in the y direction, and Lo be the distance between the lens 11 and the two-dimensional PSD 12, the coordinates (x,y) of the center of the incident spot are given by:

$$\tan\theta x = \frac{x}{Lo} \tag{1a}$$

$$\tan\theta y = \frac{y}{Lo} \tag{1b}$$

The inclination angles θx and θy detected in this case and a rotation angle θ to be described later will be described below with reference to FIG. 5C.

A rotary coordinate system xyz fixed to the head of the user of the HMD will be described in relation to a fixed external coordinate system XYZ.

The external coordinate axis Z is the above-mentioned optical axis of the substantially collimated light, which is set to be equal to the vertical direction.

An X-Y plane is present on a plane perpendicular to the external coordinate axis Z, i.e., on a horizontal plane, and the axial direction of a first polarizing plate is represented by X.

As shown in FIG. 5B, the x-, y-, and z-axes are defined such that the direction of the line of sight coincides with the x-axis; and the upward direction, the z-axis.

Let θ be the rotation angle (azimuth) around the Z-axis (horizontal direction) of the rotary coordinate system xyz.

The x- and y-components of an inclination angle θ of the z-axis with respect to the Z-axis are the inclination angles θx and θy detected in the above manner.

In other words, the rotation angles of the x- and y-axes with respect to the X and Y planes are represented by θx and θy, respectively.

When the head of the user of the HMD inclines back and forth (x direction) and right and left (y direction), the back-and-forth and lateral inclination angles θx and θy of the head of the user of the HMD with respect the external coordinate system can be directly obtained by the above calculation from the incident spot coordinates (x,y) which change with changes in inclination angles.

Figure 5C:
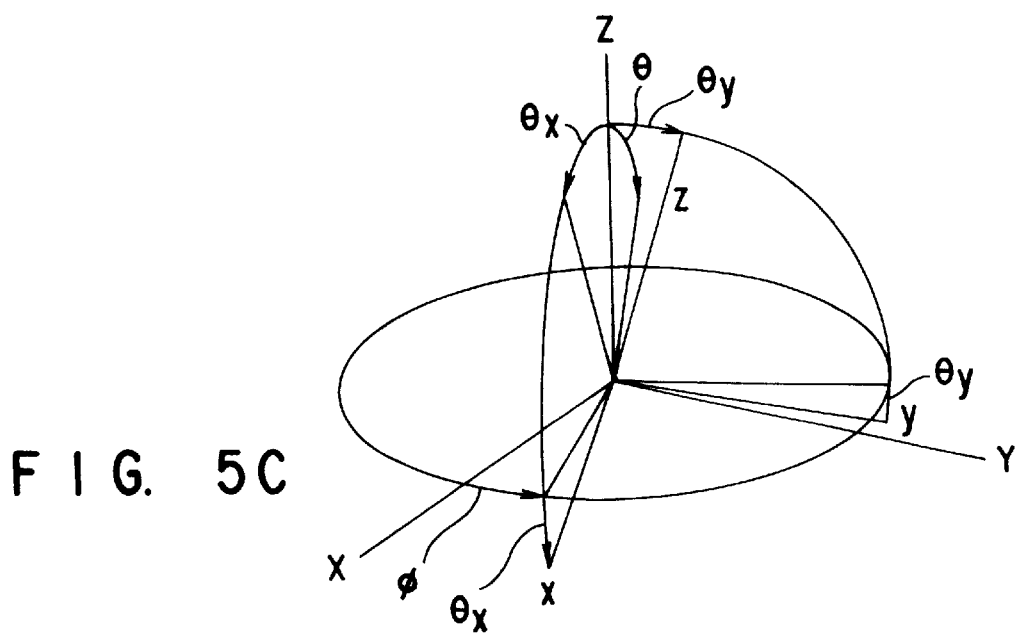
FIG. 5C is a view for explaining a coordinate system in the optical angle detection apparatus according to the first embodiment of the present invention.

In the above case, as shown in FIG. 5C, inclination angles on the HMD side (movable side) are obtained with reference to the XYZ coordinate system as the coordinate system on the light source side (stationary side). However, inclination angles on the HMD side (movable side) may be obtained with reference to the coordinate system on the HMD side (movable side).

The above spot position coordinates (x,y) are given by equations below using photo currents x1, x2, y1, and y2 extracted from the four electrodes of the two-dimensional PSD 12:

$$(x2-x1)/(x2+x1)=2x/L \tag{2a}$$

$$(y2-y1)/(y2+y1)=2y/L \tag{2b}$$

where L is the distance between electrodes.

In calculating the above inclination angles, coordinate values obtained when one of the four LEDs is caused to emit light may be used. However, the average of coordinate values obtained when two or four LEDs are caused to emit light is preferably used.

In addition, the azimuth (around the Z-axis: rotation angle in the horizontal direction) φ in FIG. 5C can be obtained by detecting a change in the amount of light incident on the two-dimensional PSD 12.

Note that an azimuth around the axis of the neck (z-axis) of the user of the HMD may be obtained instead of obtaining the azimuth φ.

Assume that the angle defined by the axis of the second polarizing plate 10 and the first polarizing plate 9-1 is represented by φ. In this case, since the light sources 5 to 8 are sequentially and periodically caused to emit light, outputs I1, I2, I3, and I4 from the two-dimensional PSD 12 in proportion to light incident amounts on the two-dimensional PSD 12 at t1=t0+nT/4, t2=t0+(n+1)T/4, t3=t0+(n+2)T/4, and t4=t0+(N+3)T/4 (where T is the emission period, t0 is the time at which an emission command is issued, and t1, t2, t3, and t4 are respectively the points of time at which the light sources 5 to 8 are caused to emit light) assume values like those shown in FIG. 6 with respect to φ (note that n is a natural number).

These light amounts (e.g., the outputs of the PSD12 which are proportional to the light amounts) are expressed as follows:

$$I1=I(1+\cos 2\phi) \tag{3a}$$

$$I2=I(1+\sin 2\phi) \tag{3b}$$

$$I3=I(1-\cos 2\phi) \tag{3c}$$

$$I4=I(1-\sin 2\phi) \tag{3d}$$

where I is a proportional coefficient.

If, therefore, the outputs I1, I2, I3, and I4 from the two-dimensional PSD 12 are loaded in synchronism with emission of light from the respective light sources, the rotation angle (azimuth) φ in the horizontal direction can be calculated according to the following equation:

$$\phi=(\tfrac{1}{2})\tan^{-1}\{(I2-I4)/(I1-I3)\} \tag{4}$$

Signal detection and calculation processing in this embodiment will be described next with reference to the circuit diagram of FIG. 3.

The LEDs 5 to 8 are sequentially and periodically turned on by an LED driver (not shown in FIG. 1A) in accordance with signals from the timing controller 3.

During this period, the photo currents x1, x2, y1, and y2 output from the four terminals of the two-dimensional PSD 12 are respectively converted into voltages V1, V2, V3, and V4 by an I/V converter 13 shown in FIG. 3.

Sample/hold circuits S/H1 to S/H4 respectively hold the values of the voltages V1, V2, V3, and V4, obtained when the LED 5 is turned on, in synchronism with the turn-on operation.

Sample/hold circuits S/H5 to S/H8 respectively hold the values of the voltages V1, V2, V3, and V4, obtained when the LED 7 is turned on, in synchronism with the turn-on operation.

Adders A1 to A4 add outputs from the sample/hold circuits S/H1 to S/H4 and the sample/hold circuits S/H5 to S/H8 to substantially average the output values.

Since the polarizing directions of the polarizing plates 9-1 and 9-3 are perpendicular to each other, an output change caused when the LED 5 is turned on exhibits a phase opposite to that of an output change caused when the LED 7 is turned on, as shown in FIG. 6. The sum of the outputs is nearly constant regardless of the value of φ.

For this reason, outputs V1', V2', V3', and V4' obtained after the above addition processing are used to calculate spot coordinates.

An adder A5 and a subtracter S1 respectively calculate (V2'+V1') and (V2'−V1'), and a divider D1 calculates (V2'−V1')/(V2'+V1'), using the outputs after addition, to obtain a coordinate x̄.

Similarly, an adder A6 and a subtracter S2 respectively calculate (V4'+V3') and (V4'−V3'), and a divider D2 calculates (V4'−V3')/(V4'+V3') to obtain a coordinate ȳ.

When conversion circuits 14 and 15 respectively obtain the arc tangents of the coordinates x̄ and ȳ, the inclination angles θx and θy are calculated.

Meanwhile, an adder A7 calculates a sum V0.

A change in V0 indicates the change amount of light incident on the two-dimensional PSD 12.

When a pulse from the timing controller 3 is input to a shift register 16, values V01 to V04 of V0, obtained when the LEDs 5 to 8 are turned on, are sequentially held by sample/hold circuits S/H9 to S/H12.

Subtracters S3 and S4 respectively calculate (V01−V03) and (V02−V04), and a divider D3 calculates (V02−V04)/(V01−V03).

A conversion circuit 17 obtains the arc tangent of the output from the divider D3 to calculate the rotation angle (azimuth) φ.

In general, the initial value (=φ0) of φ is 0 when the user of the HMD looks straight ahead.

In the above case, since the output signal φ from the calculation processing section 4 becomes discrete at −π/2 and +π/2, the use range is −π/2 to +π/2.

Note that phase coupling processing may be performed in a software or hardware manner to alleviate discrete values.

An example of the above phase coupling processing will be described with reference to the block diagram of FIG. 4A.

Letting φr be the actual azimuth, the output signal φ from the calculation processing section 4 becomes discontinuous, as shown in FIG. 4B.

For this reason, the output signal φ is differentiated by a differentiation circuit 101, and the resultant signal is input to a comparator 102. Thereafter, an output pulse from the comparator 102 is counted by a counter 103.

During this period, the comparator 102 outputs a negative pulse like the one shown in FIG. 4C when a discrete value occurs upon rotation of the sensor section 2 in the positive direction, and outputs a positive pulse like the one shown in FIG. 4D when a discrete value occurs upon rotation of the sensor section 2 in the negative direction.

In response to this pulse, the count value of the counter 103 is incremented or decremented by one. After a multiplier 104 multiplies the count value by π, an addition circuit 105 adds the product to φ, thereby obtaining a continuous signal φr like the one shown in FIG. 4E.

If a point light source is used, when the sensor position shifts from the position immediately below the light source, the corresponding lateral shift is output as an inclination angle, resulting in an error.

If the light source is located at a remote position, an error caused by a lateral shift of the head of the user of the HMD is sufficiently small.

In addition, deviation of the initial values of φ, θx, and θy can be corrected by performing calibration.

When, however, initial values are to be corrected by setting an external fixed axis Z' independently of an optical axis (Z-axis) (for example, a light beam is obliquely incident with the vertical direction being set as an external reference), the detection value is preferably converted into a value in the external coordinate system depending on the inclination of the optical axis.

According to this embodiment, the back-and-forth and lateral inclination angles θx and θy and rotation (azimuth) φ of the head of the user of the HMD can be detected by using one optical angle detection apparatus.

In addition, the optical angle detection apparatus of this embodiment uses only one expensive two-dimensional PSD and hence can be realized at a low cost.

The optical angle detection apparatus of this embodiment has the sensor section stored in one unit. The apparatus can therefore be easily attached/detached to/from the HMD body.

Furthermore, since the optical angle detection apparatus of this embodiment has the light sources stored in one unit, the light sources can be easily fixed to a ceiling, a pole, or the like, and installment of the light sources is facilitated. In addition, irradiation of direct light from the light sources onto unwanted places can be prevented.

In the optical angle detection apparatus of this embodiment, a light source dedicated for inclination angle detection may be installed independently.

This light source need not be caused to flicker, and the emission timing of the light source may be shifted from the emission timings of the remaining light sources (LEDs) by the signal loading timing to detect spot coordinates.

In the above case, existing illumination light or sun rays may be used without using any light source.

In the above case, instead of using another light source for φ detection or sequentially turning on the respective light sources, shutters which sequentially open/close may be set in front of the respective polarizing plates of the light source section.

When illumination light is to be used, the above apparatus needs to use a means for collimating each light beam.

In the above case, when sun rays are used, since a positional shift is caused by rotation and revolution of the earth, an arithmetic circuit requires a correction means.

In the above case, the light source section is mounted on the stationary side such as a ceiling, and the sensor section is mounted on the movable side such as the head of the user of the HMD. However, the light source section may be mounted on the movable side, and the sensor section may be mounted on the stationary side.

In the above case, the lens 11 may be arranged in front of the polarizing plate 10. In this case, when the second polarizing plate 10 is bonded to the two-dimensional PSD 12, the space can be omitted, and hence a compact arrangement can be realized.

As the lens (focusing optical system) 11, a reflection system having a function equivalent to that of a refraction system may be used in place of the refraction system.

FIG. 7 is a block diagram showing an optical angle detection apparatus according to the second embodiment of the present invention.

The optical angle detection apparatus of this embodiment comprises a light source section 21, a first sensor section 22, a second sensor section 23, and calculation processing sections 24 and 25.

As in the first embodiment, the light source section 21 is fixed to a ceiling, the distal end of a tall pole, or the like, and the first and second sensor sections 22 and 23 are mounted on the upper portion of the HMD or fixed to the upper portion of the head of the user of the HMD through a mounting means.

Referring to FIG. 7, the first and second sensor sections 22 and 23 seem to be located obliquely below the light source section 21. In practice, however, the first and second sensor sections 22 and 23 are located almost immediately below the light source section 21.

The second sensor section 25 may be arranged inside or outside the HMD.

As shown in FIG. 7, the light source section 21 is constituted by an LED 26 and a first polarizing plate 27.

The first sensor section 22 is used to detect azimuths, and is constituted by second polarizing plates 28-1 to 28-4 and PDs (photosensors) 29-1 to 29-4.

The PDs 29-1 to 29-4 are integrally fixed to the second polarizing plates 28-1 to 28-4, respectively.

As shown in FIG. 7, the second polarizing plates 28-1 to 28-4 are arranged on the upper portions of the PDs 29-1 to 29-4 such that the axes of polarization are set at 45°-angular intervals.

The arrangement of the respective polarizing plates is not limited to the one shown in FIG. 7, and another arrangement may be used.

The second sensor section 23 is used to detect inclination angles, and is constituted by a lens 30 and a two-dimensional PSD 31.

As in the first embodiment, the two-dimensional PSD 31 is integrally fixed to the lens 30 to be located roughly at the focal position of the lens 30.

An angle detecting operation in this embodiment will be described next with reference to FIGS. 7 to 9.

A light beam emitted from an LED 26 of the light source section 21 in FIG. 7 is linearly polarized by the first polarizing plate 27 and is incident on the first and second sensor portions.

The light beam incident on the first sensor section 22 is partly absorbed by the second polarizing plates 28-1 to 28-4 in accordance with the directions of their axes of polarization when the light passes through the second polarizing plates 28-1 to 28-4, and is incident on the PDs 29-1 to 29-4.

If the angle defined by the axis of the second polarizing plate and the axis of the first polarizing plate is represented by φ, outputs I1, I2, I3, and I4 from the PDs 29-1 to 29-4 change in accordance with the angle φ, as shown in FIG. 9.

Since this phenomenon is equivalent to that shown in FIG. 6, a rotation angle (azimuth) φ in the horizontal direction can be obtained from $\tan^{-1}\{(I2-I4)/(I1-I3)\}$.

In the calculation processing section 24 shown in the circuit diagram of FIG. 8, outputs from the PDs 29-1 to 29-4 are respectively I/V-converted by I/V converters 32-1 to 32-4 to obtain voltages V1 to V4. Thereafter, subtracters S1 and S2 respectively calculate (V1−V3) and (V2−V4), and a divider D1 calculates (V2−V4)/(V1−V3).

The arc tangent of the output from the divider D1 is obtained by a conversion circuit 33 to calculate the rotation angle (azimuth) φ.

In general, the initial value (=φ0) of φ is 0 when the user of the HMD looks straight ahead.

As in the first embodiment, the second sensor section 23 obtains the back-and-forth and lateral inclination angles θx and θy of the head of the user of the HMD from the coordinates (x,y) of a light spot focused on the two-dimensional PSD 31.

If focusing lenses are arranged in front of the respective PDs or the respective polarizing plates in the first sensor section 22, smaller PDs can be used.

In addition, instead of using separate PDs, one four-split PD can be used. In this case, a more compact arrangement can be realized.

According to this embodiment, the back-and-forth and lateral inclination angles θx and θy of the head of the user of the HMD, and an azimuth φ thereof in the horizontal direction can be detected by using one optical angle detection apparatus.

In addition, the optical angle detection apparatus of this embodiment can be realized at a lower cost by using inexpensive PDs for the sensor section for detecting the azimuth φ.

The optical angle detection apparatus of this embodiment has the sensor section stored in one unit. The apparatus can therefore be easily attached/detached to/from the HMD body.

The light source section of the optical angle detection apparatus of this embodiment is simpler than that in the first embodiment, and each sensor need not operate in synchronism with its corresponding light source. For this reason, the calculation processing section can be simplified.

Furthermore, since the optical angle detection apparatus of this embodiment has the light sources stored in one unit, the light sources can be easily fixed to a ceiling, a pole, or the like, and installment of the light sources is facilitated. In addition, irradiation of direct light from the light sources onto unwanted places can be prevented.

In the above case, the light source may be omitted, and existing illumination light or sun rays may be used.

If illumination light is to be used, a means for collimating each light beam is required.

In the above case, when sun rays are used, since a positional shift is caused by rotation and revolution of the earth, an arithmetic circuit requires a correction means.

In the above case, the light source section is mounted on the stationary side such as a ceiling, and the sensor section is mounted on the movable side such as the head of the user of the HMD. However, the light source section may be mounted on the movable side, and the sensor section may be mounted on the stationary side.

In the above case, as the second polarizing plates 28-1 to 28-4, for example, reflecting type polarizing means such as PBSs may be used.

Furthermore, in the above case, as the lens (focusing optical system) 30, a reflection system having a function equivalent to that of a refraction system may be used in place of the refraction system.

Figure 10A:
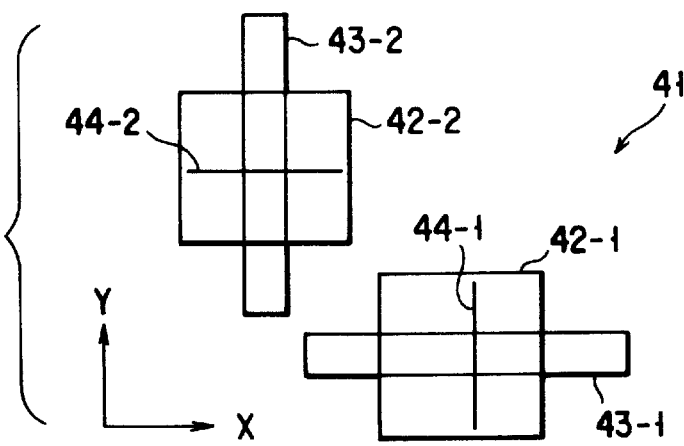
FIGS. 10A and 10B are plan and front views showing the main part of an optical angle detection apparatus according to the third embodiment of the present invention.
Figure 10B:
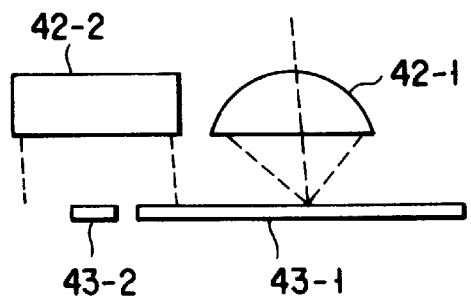

FIGS. 10A and 10B are plan and front views showing the main part of an optical angle detection apparatus according to the third embodiment of the present invention.

The optical angle detection apparatus of this embodiment has a sensor section having a function equivalent to that of the sensor section including the two-dimensional PSD in the first and second embodiments.

More specifically, as shown in FIGS. 10A and 10B, a sensor section 41 in this embodiment is constituted by a focusing optical system (cylindrical lens) 42-1 on which substantially collimated light is incident, a one-dimensional PSD 43-1 (for the x-axis) integrally fixed thereto, a focusing optical system (cylindrical lens) 42-2 on which substantially collimated light is incident, and a one-dimensional PSD 43-2 (for the y-axis) integrally fixed thereto.

The above two sets of cylindrical lenses and one-dimensional PSDs are arranged such that the longitudinal axes of the one-dimensional PSDs 43-1 and 43-2 are perpendicular to each other.

An angle detecting operation in this embodiment will be described next with reference to FIG. 11, which shows the principle of the operation.

Figure 11:
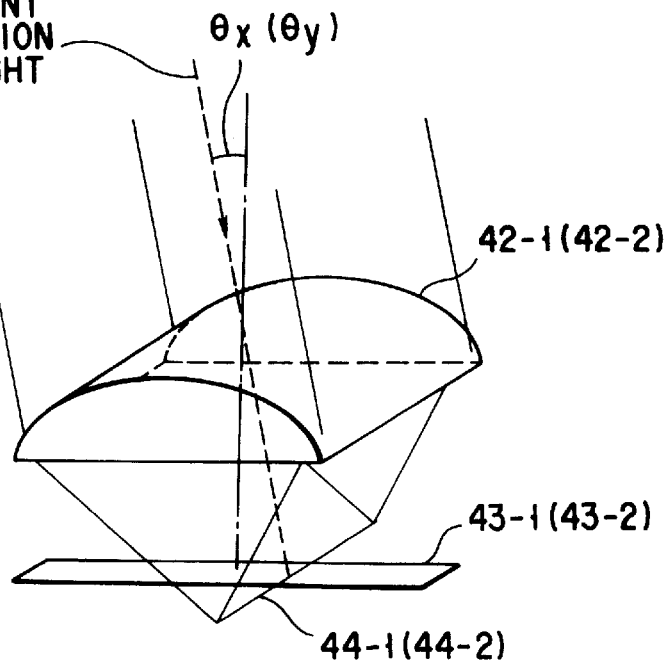
FIG. 11 is a view for explaining the principle of an angle detection operation in the optical angle detection apparatus according to the third embodiment of the present invention.

Substantially collimated light incident from a light source (an LED, the sun, an illumination, or the like) (not shown) is linearly focused on the one-dimensional PSD 43-1 (43-2) by the cylindrical lens 42-1 (42-2) of the sensor section 41 in FIG. 11 to form a linear spot 44-1 (44-2).

Back-and-forth and lateral inclination angles θx and θy of the head of the user of the HMD are detected on the basis of the x-axis (y-axis) position of a linear spot 44-1 (44-2) crossing the one-dimensional PSD 43-1 (43-2) in the same manner as in the first and second embodiments.

According to this embodiment, since one-dimensional PSDs, which are much cheaper than two-dimensional PSD sensors, are used for the sensor section instead of expensive two-dimensional PSDs, an optical angle detection apparatus can be realized at a low cost.

As a focusing optical system, a cylindrical lens is preferably used as in the above case. However, an anarmorphic lens may be used. Alternatively, in order to facilitate the manufacture of a lens, a telecentric optical system may be used to irradiate elongated spot light.

In addition, distributed index lenses respectively designed to have the functions of the above lenses may be used.

Furthermore, a reflection system (e.g., a cylindrical concave mirror) having a function equivalent to that of a refraction system may be used in place of the refraction system.

Figures 12A, 12B:
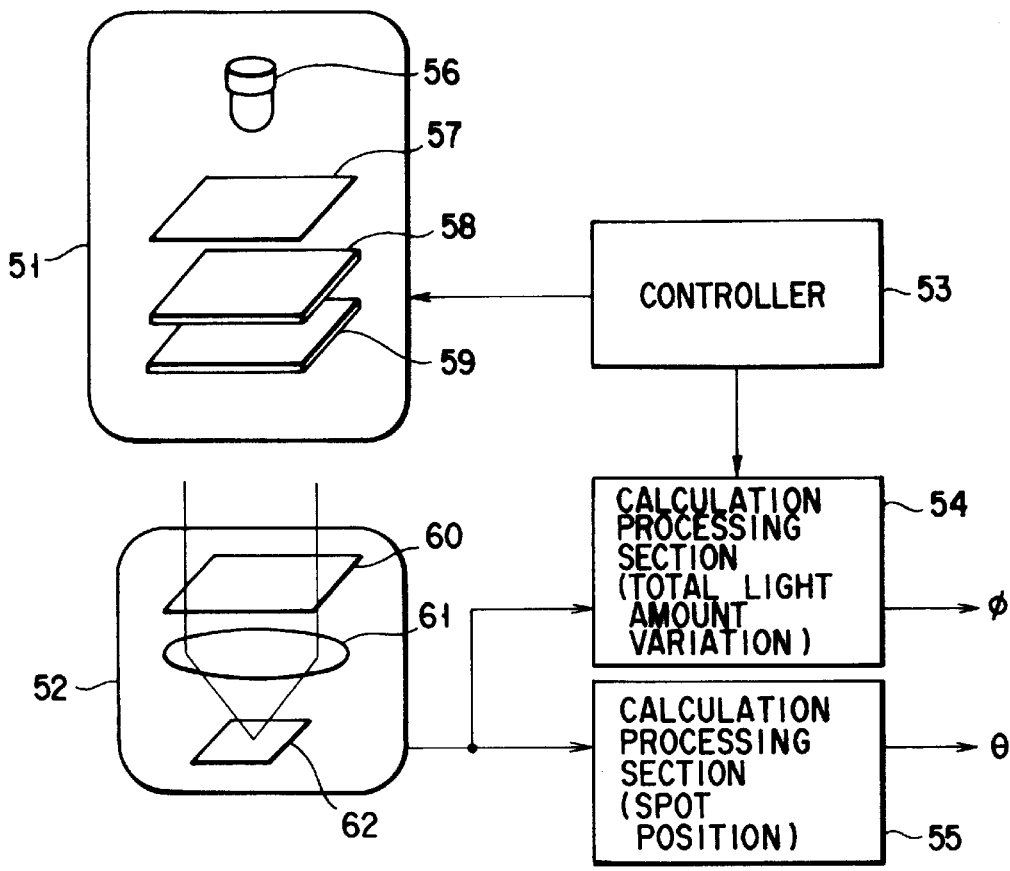
FIG. 12A is a block diagram showing the optical angle detection apparatus according to the fourth embodiment of the present invention.
FIG. 12B is a view for explaining the operation of the optical angle detection apparatus according to the fourth embodiment of the present invention.

FIG. 12A is a block diagram showing an optical angle detection apparatus according to the fourth embodiment of the present invention.

The optical angle detection apparatus of this embodiment comprises a light source section 51, a sensor section 52, a controller 53, and calculation processing sections 54 and 55.

As in the first embodiment, the light source section 51 is fixed to a ceiling, the distal end of a tall pole, or the like, and the sensor section 52 is mounted on the upper portion of the HMD or fixed to the upper portion of the head of the user of the HMD through a mounting means.

The controller 53 and the calculation processing sections 54 and 55 may be arranged inside or outside the HMD.

As shown in FIG. 12A, the light source section 51 is constituted by an LED 56, a first polarizing plate 57, a π/4 cell 58, and a π/2 cell 59. These components are arranged on the optical axis of the LED 56.

Figure 13A:
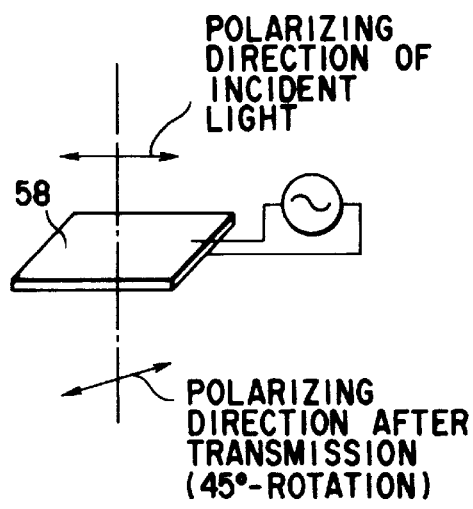
FIGS. 13A and 13B are views for explaining the operations of $\pi/4$ and $\pi/2$ cells of the optical angle detection apparatus according to the fourth embodiment of the present invention.

The π/4 cell 58 is a type of liquid crystal, and has a azimuth rotation characteristic that the polarizing direction of linearly polarized light which is transmitted through the π/4 cell 58 can be rotated about 45°, as shown in FIG. 13A.

When a voltage is applied to the π/4 cell 58, since the azimuth rotation characteristic is instantaneously lost, the polarizing direction of linearly polarized light which is transmitted through the π/4 cell 58 does not change.

Figure 13B:
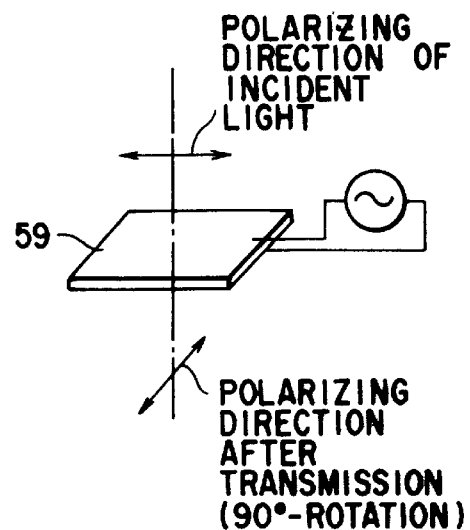

Similarly, the π/2 cell 59 has a azimuth rotation characteristic that the polarizing direction of linearly polarized light which is transmitted through the π/2 cell 59 can be rotated about 90°, as shown in FIG. 13B.

When, a voltage is applied to the π/2 cell 59, the azimuth rotation characteristic is instantaneously lost.

The sensor section 52 is constituted by a second polarizing plate 60, a focusing optical system (lens) 61, and a two-dimensional PSD 62. The two-dimensional PSD 62 is located approximately at the focal position of the lens 61.

Since the calculation processing sections 54 and 55 are equivalent to the controller 3 and the calculation processing section 4 in the first embodiment, a description thereof will be omitted.

An angle detecting operation in this embodiment will be described next with reference to FIGS. 12A and 12B.

A light beam emitted from the LED 56 of the light source section 51 is linearly polarized by the first polarizing plate 57 and is transmitted through the π/4 cell 58 and the π/2 cell 59.

In this case, when ON/OFF operations of the π/4 cell 58 and the π/2 cell 59 are periodically controlled in accordance with the combination in FIG. 12B, transmitted light beams whose polarizing directions are different from each other by 45° are obtained with time, as indicated by the lowermost row in FIG. 12B.

This transmitted light is incident on the sensor section 52, and part of the light is transmitted through the second polarizing plate 60 to be focused on the two-dimensional PSD 62 through the lens 61.

Outputs from the two-dimensional PSD 62 are loaded in synchronism with ON/OFF operations of the π/4 cell 58 and the π/2 cell 59.

If the angle defined by the axis of the second polarizing plate 60 and the first polarizing plate 57 is represented by φ, the rotation angle (azimuth) φ in the horizontal direction can be obtained in the same manner as in the first embodiment.

Since the polarizing direction of polarized light from the light source section 51 changes by 45° at predetermined time intervals of T/4, all outputs from the two-dimensional PSD 62 at time t1=t0+nT/4, time t2=t0+(n+1)T/4, time t3=t0+(n+2)T/4, and time t4=t0+(n+3)T/4 assume values like those shown in FIG. 6 with respect to φ.

As in the first embodiment, the rotation angle (azimuth) φ in the horizontal direction is calculated from outputs I1, I2, I3, and I4 at the respective points of time according to the following equation:

$$\phi=(\tfrac{1}{2})\tan^{-1}\{(I2-I4)/(I1-I3)\} \quad (4)$$

Back-and-forth and lateral inclination angles θx and θy of the head of the user of the HMD are detected from the two-dimensional PSD in the same manner as in the first embodiment.

According to this embodiment, the back-and-forth and lateral inclination angles θx and θy of the head of the user of the HMD and the azimuth φ thereof in the horizontal direction can be detected by one optical angle detection apparatus.

In addition, since the optical angle detection apparatus of this embodiment uses only one expensive two-dimensional PSD, the apparatus can be realized at a low cost.

Furthermore, since the optical angle detection apparatus of this embodiment uses only one LED as a light source, and one polarizing plate on each of the light source side and the sensor side, both the light source section and the sensor section can be reduced in size, and assembly thereof is facilitated.

The optical angle detection apparatus of this embodiment has the sensor section stored in one unit. The apparatus can therefore be easily attached/detached to/from the HMD body.

Furthermore, since the optical angle detection apparatus of this embodiment has the light sources stored in one unit, the light sources can be easily fixed to a ceiling, a pole, or the like, and installment of the light sources is facilitated. In addition, irradiation of direct light from the light sources onto undesired places can be prevented.

In the above case, the light source may be omitted, and existing illumination light or sun rays may be used.

If illumination light is to be used, a means for collimating each light beam is required.

In the above case, when sun rays are used, since a positional shift is caused by rotation and revolution of the earth, an arithmetic circuit requires a correction means.

In the above case, the light source section is mounted on the stationary side such as a ceiling, and the sensor section is mounted on the movable side such as the head of the user of the HMD. However, the light source section may be mounted on the movable side, and the sensor section may be mounted on the stationary side.

In the above case, the lens 61 may be arranged in front of the polarizing plate 60. In this case, when the polarizing plate 60 is bonded to the two-dimensional PSD 62, the space can be omitted, and hence a compact arrangement can be realized.

As the lens (focusing optical system) 61, a reflection system having a function equivalent to that of a refraction system may be used in place of the refraction system.

Figure 14:
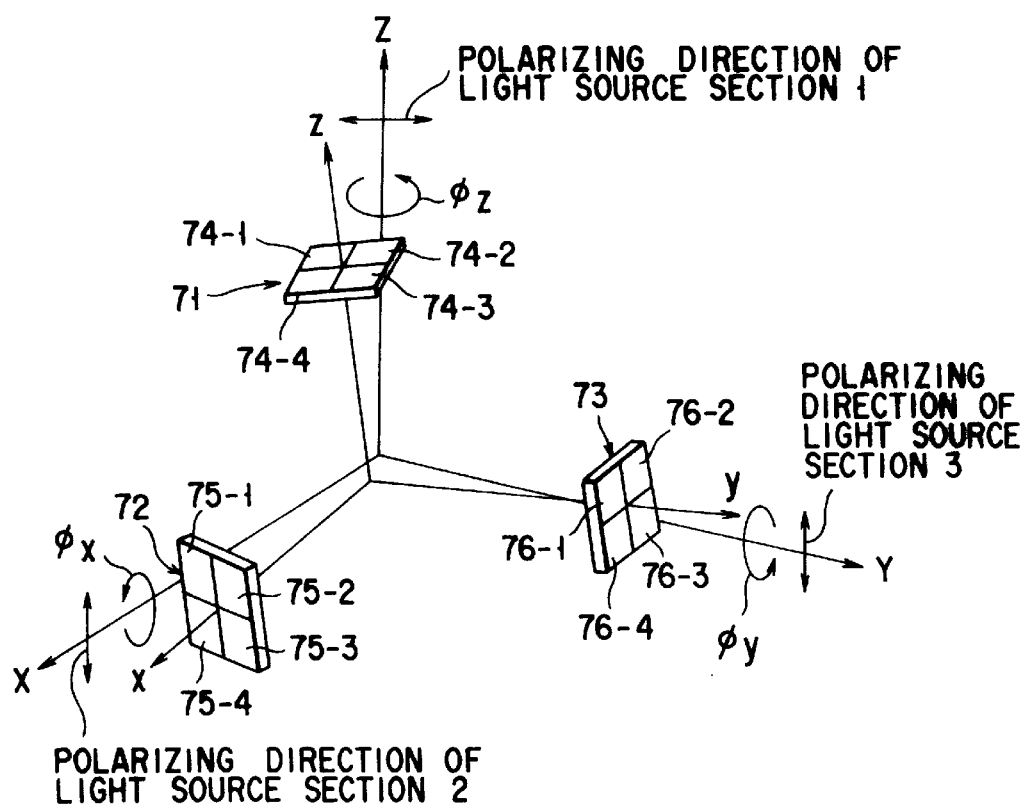
FIG. 14 is a view showing the main part of an optical angle detection apparatus according to the fifth embodiment of the present invention.

FIG. 14 shows an optical angle detection apparatus according to the fifth embodiment of the present invention.

The optical angle detection apparatus of this embodiment is constituted by three sets of light source sections 21, sensor sections 22, and calculation processing sections 24 each having the same arrangement as that in the second embodiment. FIG. 14 shows only sensor sections 71, 72, and 73.

In this embodiment, light sources 1, 2, and 3 (not shown) each having the same arrangement as that of the light source section 21 in the second embodiment are arranged such that normals to the respective polarizing plates are perpendicular to each other. Referring to FIG. 14, the respective normals are represented by X, Y, and Z.

The sensor sections 71, 72, and 73 are fixed to have such a positional relationship that the normal to a polarizing plate of one sensor section crosses the normals to polarizing plates of the remaining sensor sections at right angles, i.e., polarizing plates 74-1 to 74-4 of the sensor section 71 are perpendicular to polarizing plates 75-1 to 75-4 of the sensor section 72 and polarizing plates 76-1 to 76-4 of the sensor section 73. Referring to FIG. 14, the normals to the respective sensor sections are represented by x, y, and z.

Figure 15B:
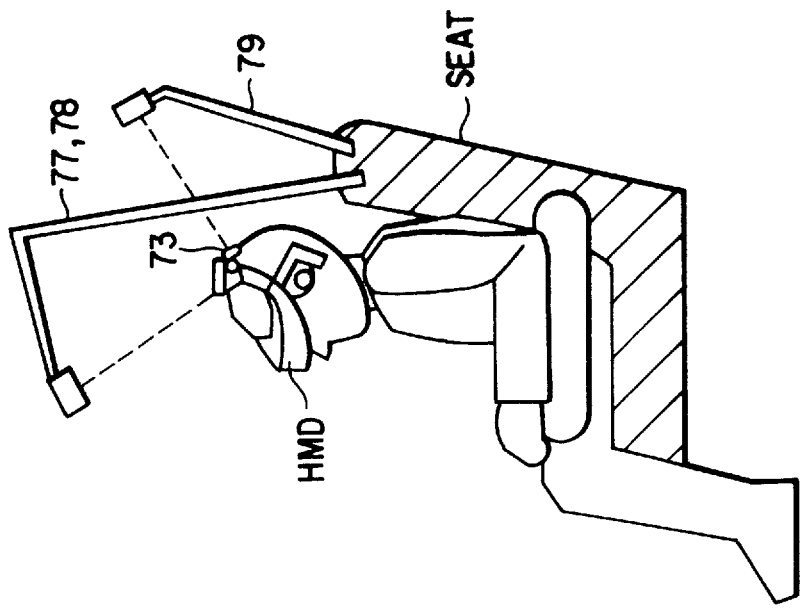
FIGS. 15A and 15B are front and side views showing an example of how the optical angle detection apparatus according to the fifth embodiment of the present invention is used.
Figure 15A:
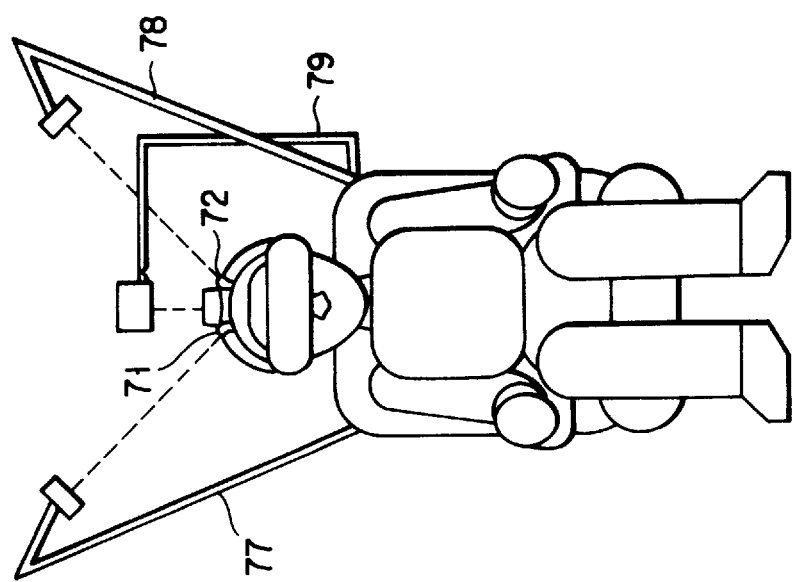

For example, as shown in the front view of FIG. 15A and the side view of FIG. 15B, for a well-balanced condition, the light sources 1, 2, and 3 are set by using arms 77, 78, and 79 extending from the seat in such a manner that two light sources are located at upper oblique positions before the user, and the remaining one light source is located at an upper oblique position behind the user.

An angle detecting operation in this embodiment will be described with reference to FIG. 14.

When the user of the HMD looks straight ahead, the polarizing plates (not shown) of the light source sections which oppose the polarizing plates of the respective sensor sections become parallel to each other, and the directions of the axes of polarization of the polarizing plates 74-1, 75-1, and 76-1 become parallel to the polarizing directions of the respective light sources.

When the user rotates and inclines the head, the directions of the axes of polarization of the polarizing plates of the respective sensor sections change with respect to the polarizing directions of the respective light source sections. As a result, rotation angles θx, θy, and θz of each sensor section with respect to the X-, Y-, and Z-axes are calculated from outputs from the four PDs (not shown) of each sensor section in the same manner as in the second embodiment.

By integrating the calculated rotation angles of the respective sensor sections, a change in the direction of the rotary coordinate system x-y-z constituted by the sensor sections with respect to the external coordinate system X-Y-Z, i.e., a change in the direction of the head of the user, can be calculated.

According to this embodiment, PDs cheaper than two-dimensional PSD sensors are used for the sensor sections instead of expensive two-dimensional PSDs, and the three sets of light source sections, sensor sections, and calculation processing sections, each set comprising identical components, are used. An optical angle detection apparatus can therefore be realized at a low cost.

Unlike in the first to fourth embodiments, in the optical angle detection apparatus of this embodiment, when the light source section shifts laterally, no inclination angle shift is caused. This apparatus is therefore effective in a case wherein light source sections cannot be set at sufficiently remote positions.

In each embodiment described above, LEDs are used as light sources. However, other types of light sources may be used.

If, for example, light sources designed to emit linearly polarized light beams, e.g., LDs (semiconductor lasers), are used, the polarizing plates on the light source side can be omitted.

In addition, a lens may be set behind each light source to change the spread of a light beam.

The wavelength band of a PSD or PD is broad, including the visible region to the near-infrared region. For this reason, if such a sensor is used in a bright place, a large noise component is produced. In this case, therefore, a visible light cut filter or band-pass filter may be set in front of the sensor to reduce unnecessary external light.

In order to remove such a noise component more reliably, light from a light source may be modulated at a frequency higher than the sampling frequency to perform synchronous detection, or a specific frequency component such as a light component from a fluorescent lamp may be cut.

In the first, second, and fifth embodiments, four polarizing plates having axes of polarization in different directions are used. However, one of these plates may be omitted.

In this case, the equation for calculating φ is modified as follows.

For example, arbitrary three outputs of the four outputs in the first embodiment, i.e., I1, I2, and I3, may be used to calculate φ by:

$$\phi = (\tfrac{1}{2})\tan^{-1}\{(I1-I2)/(I2-I3)\} \quad (5)$$

The present invention is not limited to the embodiments described above, and various changes and modifications can be made.

For example, there is provided an optical angle detection apparatus characterized in that one of the means for generating substantially collimated light and the sensor portion is disposed on a stationary portion, and the other is disposed on a movable portion (note 1).

In this case, by spatially fixing the means for generating substantially collimated light or the sensor section, the angle of at least one of the coordinate axes determined by the means for generating substantially collimated light or the sensor section is spatially fixed, and the rotation angles (inclination angles) of the movable portion in at least two directions with respect to the spatially fixed coordinate axis are detected.

In addition, there is provided an HMD (Head Mounting Display) system characterized by including the above optical angle detection apparatus (note 2).

In this case, the rotation angles (inclination angles) of the coordinate system of the HMD or the user of the HMD in at least two directions are detected by the optical angle detection apparatus.

The above optical angle detection apparatus is characterized by including a timing means, a light source driver for sequentially and periodically causing the above three or more polarized light sources to emit light upon reception of signals from the timing means, and a calculation processing means for processing outputs from the photosensors in synchronism with the polarized light sources upon reception of a signal from the timing means (note 3).

In this case, since the light source driver sequentially and periodically causes the three or more polarized light sources to emit light upon reception of signals from the timing means, three or more polarized light beams are sequentially incident on the sensor section, and the amount of incident light dependent on the angle defined by the direction of each polarized light beam and the axis of polarization of the polarizing means of the sensor section is transmitted through or reflected by the polarizing means to be incident on the photosensor.

The calculation processing section holds an output from the photosensor in synchronism with emission of light from the polarizing plate, and performs calculation processing. Thereafter, the calculation processing means calculates the angle of the light source means relative to the sensor section with respect to the axis determined by the light source means or the sensor section.

The above optical angle detection apparatus may be characterized in that each of the three or more polarized light sources is constituted by a light source and a polarizing plate corresponding to the light source, and the respective polarizing plates have different axes of polarization (note 4).

In this case, light beams emitted from the respective light sources are converted into linearly polarized light beams having different polarizing directions by the corresponding polarizing plates.

The above optical angle detection apparatus may be characterized by including a focusing optical system for focusing the polarized light onto the sensor (note 5).

In this case, since three or more polarized light sources having different polarizing directions are sequentially and periodically caused to emit light by the light source driver upon reception of signals from the timing means, three or more polarized light beams are sequentially incident on the sensor section, and part of the incident light is transmitted through the polarizing means in accordance with the angle defined by the direction of the polarized light and the axis of polarization of the polarizing means of the sensor section so as to be focused onto a position dependent on the angle of the incident light on the photosensor by the focusing optical system.

The calculation processing section holds an output from the photosensor in synchronism with emission of light from the polarizing plate in response to a signal from the timing means, and performs calculation processing. Thereafter, the calculation processing means calculates the angle of the light source means relative to the sensor section with respect to the axis determined by the light source means or the sensor section.

The above optical angle detection apparatus may be characterized in that the focusing optical system includes a plurality of cylindrical lenses, and the photosensor is a one-dimensional position sensor corresponding to each cylindrical lens (note 6).

In this case, a plurality of polarized light beams having different polarizing directions are sequentially incident on the sensor section, and the amount of light dependent on the angle defined by the polarizing direction of each polarized light source and the direction of the axis of polarization of the polarizing means of the sensor portion is transmitted through or reflected by the polarizing means to be focused into a linear spot by the cylindrical lens. This linear spot crosses the one-dimensional position sensor corresponding to the cylindrical lens at a position dependent on the angle of a light beam incident from the light source means onto the cylindrical lens.

The rotation angle (inclination angle) of the sensor section in an axial direction determined by the light source means or the sensor section is detected from an output from each one-dimensional position sensor, and the angle of the light source means relative to the sensor section around the axis determined by the light source means or the sensor section are detected.

The above optical angle detection apparatus may be characterized in that one of the light source means and the sensor section is disposed on a stationary portion in a space, and the other is disposed on a movable portion (note 7).

In this case, by spatially fixing the light source means or the sensor section, the angle of at least one of the coordinate axes determined by the light source means or the sensor section is spatially fixed, and the rotation angles (inclination angles) of the movable portion in one to three axial directions with respect to the spatially fixed coordinate axis are detected.

There may be provided an HMD system characterized by including the above optical angle detection apparatus (note 8).

In this case, the rotation angles of the HMD or the user of the HMD in one to three axial directions with respect to the spatially fixed coordinate axis are detected by the above optical angle detection apparatus.

There may be provided an HMD system characterized by including an optical three axial angle detection apparatus constituted by a light source means for emitting polarized light, and a sensor section disposed separately from the light source means through a space and including a polarizing means, a focusing optical system, and a two-dimensional position sensor (note 9).

In this case, polarized light emitted from the light source means is incident on the sensor section, and part of the light is transmitted through the polarizing means in accordance with the angle defined by the polarizing direction of the light source means and the direction of the axis of polarization of the sensor section so as to be focused onto the two-dimensional position sensor by the focusing optical system.

The rotation angles (inclination angles) of the HMD or the head of the user of the HMD in three directions with respect to the axis determined by the light source means or the sensor section are detected from the amount of light incident on the two-dimensional position sensor and the position coordinates of an incident spot.

There may be provided an optical angle detection apparatus characterized by including a light source means for emitting polarized light, a sensor section disposed separately from the light source means through a space and including a polarizing means, a focusing optical system, and a two-dimensional position sensor, and a means for changing the polarizing direction temporarily or spatially on the light source means or sensor section side (note 10).

In this case, owing to the angle defined by the polarizing direction of the light source means and the direction of the axis of polarization of the polarizing means of the sensor section, a plurality of states different from each other by a predetermined magnitude are present temporarily or spatially, and the angle of the light source means relative to the sensor section around the axis determined by the light source means or the sensor section is detected from the amount of light incident on the two-dimensional position sensor in each of the conditions. In addition, the rotation angles (inclination angles) of the sensor section in two directions around the axis determined by the light source means or the sensor section are detected from the position coordinates of an incident spot focused on the two-dimensional position sensor by the focusing optical system.

There may be provided an optical angle detection apparatus characterized by including a light source means for sequentially and periodically emitting a plurality of polarized light beams having different polarizing directions, a sensor section disposed separately from the light source means through a space and including a polarizing means, a focusing optical system, and a two-dimensional position sensor, and a calculation processing means for processing an output from the sensor section in synchronism with the timing at which the polarized light beam is emitted (note 11).

In this case, a plurality of polarized light beams having polarizing directions different from each other by a predetermined angle are sequentially emitted from the light source means, and part of the incident light is transmitted through the polarizing means in accordance with the angle defined by the polarizing direction of the polarized light beam and the direction of the axis of polarization of the polarizing means of the sensor section, and is focused at a position dependent on the angle of the incident light on the two-dimensional position sensor by the focusing optical system.

The calculation processing means holds an output from the two-dimensional position sensor in synchronism with the timing at which the polarized light beam is emitted, and performs calculation processing. Thereafter, the calculation processing means detects the angle of the light source means relative to the sensor section around the axis determined by the light source means or the sensor section, and calculates the position coordinates of an incident spot focused on the two-dimensional position sensor by the focusing control system, thereby detecting the rotation angles (inclination angles) of the sensor section in two directions around the axis determined by the light source means and the sensor section.

The above optical angle detection apparatus may be characterized in that one of the means for generating polarized light and the sensor section is disposed on a stationary portion in a space, and the other is disposed on a movable portion (note 12).

In this case, by spatially fixing the means for generating polarized light or the sensor section, at least one angle of a coordinate axis determined by the means for generating polarized light or the sensor section is spatially fixed, and the rotation angle of the movable portion with respect to the spatially fixed coordinate axis is detected.

There may be provided an HMD system characterized by including the above optical angle detection apparatus (note 13).

In this case, the rotation angle of the HMD or the user of the HMD with respect to the spatially fixed coordinate axis is detected by the optical angle detection apparatus.

There may be provided an optical angle detection apparatus characterized by including a plurality of optical angle detection apparatuses, each identical to the apparatus described above, wherein one of the means for generating polarized light and the sensor section is disposed on a stationary portion in a space, and the other is disposed on a movable portion, and the apparatus further includes calculation processing means for integrating and processing outputs from a plurality of sensor sections (note 14).

In this case, a plurality of polarized light beams are incident on the corresponding sensor sections, and the amounts of incident light dependent on angles defined by the polarizing directions of the respective polarized light beams and the directions of the axes of polarization of a plurality of polarizing means of said sensor sections are transmitted through or reflected by the respective polarizing means to be incident on photosensors corresponding to the respective polarizing means.

The angle of the means for generating polarized light relative to the sensor section around the axis determined by the means for generating polarized light or the sensor section is detected from an output from each photosensor.

The calculation processing means calculates the rotation angles of the sensor section in a plurality of directions with respect to a coordinate axis determined by each means for generating polarized light or a coordinate axis located at a position separated from the above coordinate axis by a predetermined angle.

There may be provided an HMD system characterized by including the above optical angle detection apparatus (note 15).

In this case, the rotation angles of the HMD or the head of the user of the HMD in a plurality of directions with respect to a spatially fixed coordinate system determined by the means for generating polarized light or the sensor section are calculated.

The above optical angle detection apparatus may be characterized in that the liquid crystal member includes $\pi/4$ and $\pi/2$ cells, the control mechanism periodically controls ON/OFF operations of the $\pi/4$ and $\pi/2$ cells in accordance with a predetermined combination, and the apparatus further includes calculation processing means for holding an output result from the photosensor in synchronism with the ON/OFF operations of the $\pi/4$ and $\pi/2$ cells and performing calculation processing (note 16).

In this case, the polarizing direction of polarized light emitted from a light source means is periodically changed by a predetermined angle when the light is transmitted through the $\pi/4$ and $\pi/2$ cells which are ON/OFF-controlled by the control mechanism, and the resultant light is incident on a polarizing member.

The amount of light corresponding to the angle defined by the changed polarizing direction and the direction of the axis of polarization of the polarizing member is transmitted through or reflected by the polarizing member to be detected by the photosensor, and a one-period output result from the photosensor is held by the calculation processing means to be subjected to calculation processing, thereby calculating the angle of the light source means relative to the sensor section around the axis determined by the light source means or the sensor section.

The above optical angle detection apparatus may be characterized in that the sensor section is a two-dimensional position sensor having a focusing optical system before or after the polarizing member (note 17).

In this case, the polarizing direction of polarized light emitted from the light source means is changed by a predetermined angle over time when the light is transmitted through the liquid crystal member to which a voltage changed over time by the control mechanism is applied, and the resultant light is incident on the polarizing member.

The amount of light corresponding to the angle defined by the changed polarizing direction and the direction of the axis of polarization of the polarizing member is transmitted through or reflected by the polarizing member, and is focused on the two-dimensional position sensor by the focusing optical system.

The angle of the light source means relative to the two-dimensional position sensor around the axis determined by the light source means or the two-dimensional position sensor is calculated from the magnitude of an output from the two-dimensional position sensor which changes over time. In addition, rotation angles (inclination angles) in two directions with respect to the axis determined by the light source means or the two-dimensional position sensor are calculated from the position coordinates of an incident spot focused on the two-dimensional position sensor.

The above optical angle detection apparatus may be characterized in that the sensor section is a one-dimensional position sensor having a cylindrical lens (note 18).

In this case, the polarizing direction of polarized light emitted from the light source means is changed by a predetermined angle over time when the light is transmitted through the liquid crystal member to which a voltage changed over time by the control means is applied, and the resultant light is incident on the polarizing member.

The amount of light corresponding to the angle defined by the changed polarizing direction and the direction of the axis of polarization of the polarizing member is transmitted through or reflected by the polarizing member, and is focused into a linear spot by the cylindrical lens.

This linear spot crosses the one-dimensional position sensor corresponding to the cylindrical lens at a position dependent on the angle of a light beam incident on the cylindrical lens.

The angle of the light source means relative to the one-dimensional position sensor with respect to the axis determined by the light source means or the one-dimensional position sensor is calculated from the magnitude of an output from the one-dimensional position sensor which changes over time.

The above optical angle detection apparatus may be characterized in that one of the light source means and the sensor section is disposed on a stationary portion in a space, and the other is disposed on a movable portion (note 19).

In this case, by spatially fixing the light source means or the sensor section, the angle of at least one of the coordinate axes determined by the light source means or the sensor section is spatially fixed, and the rotation angle of the movable portion with respect to the spatially fixed coordinate axis is detected.

There may be provided an HMD system characterized by including the above optical angle detection apparatus (note 20).

In this case, the rotation angles of the HMD or the head of the user of the HMD with respect to the spatially fixed coordinate axis are detected by the optical angle detection apparatus.

In the above embodiments (e.g., the second embodiment), the second sensor section (inclination sensor) for detecting the inclination angle θ is constituted by a lens and a two-dimensional position sensor. However, the second sensor section may be designed such that an incident light beam from a light source is selected by an opening, a light-shielding plate, a filter, a lens, and the like and is incident on a light-receiving element such as a general photodiode (PD).

FIGS. 16 to 25 show other arrangements of the second sensor section.

In the arrangement shown in FIG. 16, since the amount of light passing through an opening 101 decreases in accordance with an inclination angle φ of light incident on the opening 101, the inclination angle φ can be detected from an output from a light-receiving element 102.

Note that the shape of the opening 101 is not limited to a circular shape, and may be rectangular.

In the arrangement shown in FIG. 17, an opening 101 is inclined in one direction in advance with respect to the light-receiving surface of a light-receiving element 102. With this arrangement, when the inclination angle of incident light is 0, the amount of light passing through the opening 101 assumes an intermediate value, whereas when incident light has a certain inclination angle, the amount of light assumes the maximum value. For this reason, the plus/minus sign (direction) of the inclination of incident light can be determined.

In the arrangement shown in FIGS. 18A and 18B, when incident light inclines, an irradiation area 103 irradiated with a light beam passing through an opening 101 moves on the light-receiving surface of a light-receiving element 102 to extend outside the light-receiving surface. As a result, the light-receiving area of the light-receiving element 102 changes, and hence an output from the light-receiving element 102 changes in accordance with the inclination of incident light.

The arrangement shown in FIG. 19 is the same as that shown in FIGS. 18A and 18B except that an opening has a rectangular shape.

In this case, when incident light inclines in the long-side direction (x-axis direction) of the rectangle, an irradiation area 103 irradiated with a light beam passing through an opening 101 partly extends outside the light-receiving surface of a light-receiving element 102. As a result, the light-receiving area of the light-receiving element 102 changes.

On the contrary, when incident light inclines in the short-side direction (y-axis direction) of the rectangle, the light-receiving area of the light-receiving element 102 does not change unless the inclination angle is excessively large.

Even if, therefore, a sensor section inclines in two directions, only the inclination in one axial direction can be detected.

In addition, since the opening 101 is shifted from the light-receiving surface of the light-receiving element 102 as shown in FIG. 19, the light-receiving area can be changed depending on the plus/minus sign of the inclination angle. An inclination angle in one axial direction can therefore be calculated from an output from the light-receiving element 102.

Assume two sensor sections each identical to the one shown in FIG. 19 are used. In this case, if one sensor section is rotated through 90° with respect to the other sensor section to have sensitivity in the y-axis direction, inclination angles in two axial directions can be detected.

As in the arrangement shown in FIG. 20, the amount of light incident on a light-receiving element 102 can be increased by using a lens 104.

Referring to FIG. 20, incident light is focused in the y-axis direction by a cylindrical lens used as the lens 104, and a slit-like irradiation area 103 selected by an opening 101 is formed on the light-receiving surface of the light-receiving element 102.

It suffices if incident light is focused such that the irradiation area 103 does not completely deviate from the light-receiving surface of the light-receiving element 102 upon inclination in the y-axis direction. For this reason, the light-receiving surface of the light-receiving element 102 need not be located at the focal position of the lens 104.

The light-receiving area of the light-receiving element 102 changes in the x-axis direction in accordance with the inclination angle as in the arrangement shown in FIG. 19.

Note that the lens 104 may be located below the opening 101. In addition, the outer shape of the lens 104 or its mount itself can be regarded as the opening 101.

In the arrangement shown in FIGS. 21A and 12B, incident light is selected by a light-shielding plate 105 instead of an opening.

Referring to FIG. 21A, the light-shielding plate 105 sufficiently elongated in the y-axis direction is disposed above the light-receiving element 102 to cover almost half of the light-receiving surface of a light-receiving element 102.

Since the edge of a shadow 106 of the light-shielding plate 105 moves on the light-receiving surface of the light-receiving element 102 upon inclination in the X-axis direction, an inclination angle can be obtained from a change in the amount of light received by the light-receiving element 102.

As shown in FIG. 21B, with a light-shielding wall 107, the width of the light-shielding plate 105 in the x-axis direction can be reduced.

Assume that an inclination angle is detected from only the amount of light received by a light-receiving element. In this case, detection of an inclination angle tends to be influenced by a change in light amount before incident light is selected by the opening or the light-shielding plate, e.g., variations in output from a light source itself or a change in the amount of light incident on a sensor section regardless of the inclination angle as in the first and fourth embodiments.

In general, in order to prevent such inconvenience, a reference light-receiving portion may be used, or the output differences between a plurality of light-receiving elements are obtained and normalized by an output sum.

As in the arrangement shown FIG. 22A, two sensor sections each identical to the one shown in FIG. 19 are arranged such that shifts of an opening 101 are in opposite directions. Alternatively, as in the arrangement shown in FIG. 22B, one opening 101 is arranged to extend across the light-receiving surfaces of two light-receiving elements 102.

With such an arrangement, the output difference between the two light-receiving elements 102 depends on the magnitude and direction of the inclination angle. When the inclination of incident light is 0, the output difference is 0. When the inclination is negative (the dotted lines lowering rightward in FIGS. 22A and 22B), the output difference becomes negative. When the inclination is positive, the output difference becomes positive.

By dividing such an output difference by the sum of outputs from the two light-receiving elements, the influence of light amount variations can be eliminated.

In addition, even if part of the irradiation area extends outside the light-receiving surface upon inclination in the y-axis direction, the resultant influence is canceled.

Similarly, as in the arrangement shown in FIG. 23, four sensor sections each identical to the one shown in FIG. 19 are arranged such that the directions of shifts of openings 101 are 90° apart from each other.

With this arrangement, inclination angles in two axial directions can be detected.

Instead of the arrangement shown in FIG. 23, one differentiation circuit 101 and one four-split light-receiving element 108 may be used as in the arrangement shown in FIG. 24.

With this arrangement, an inclination angle in the x-axis direction is obtained from the difference between the sum of outputs from light-receiving elements 108-1 and 108-3 and the sum of outputs from light-receiving elements 108-2 and 108-4 of the four-split light-receiving element 108, and an inclination angle in the y-axis direction is obtained from the difference between the sum of outputs from the light-receiving elements 108-1 and 108-4 and the sum of outputs from the light-receiving elements 108-3 and 108-3 of the four-split light-receiving element 108.

With the use of a light-shielding plate, inclination angles in the x- and y-axis directions can be obtained in the same manner as described above.

In this case, for example, as shown in FIGS. 21A and 21B, the light-receiving surface of a second light-receiving element may be placed near the left side of the comparator 102 of the sensor section. Alternatively, as shown in FIG. 21C, a light-shielding plate may be placed between two light-receiving elements to obtain the difference between outputs from the two light-receiving elements.

In addition, as in the arrangement shown in FIG. 25, two sensor sections each identical to the one shown in FIG. 17 are arranged to have opposite characteristics.

With this arrangement, by obtaining the difference between outputs from the two light-receiving elements, inclination angles in the x- and y-axis directions can be obtained in the same manner as described above.

In addition to an existing sensor section for detecting inclination angles, an acceleration sensor, a gyro sensor, and the like can be used in such a manner that the respective sensor are selectively used in accordance with the moving speed or measurement range.

If an azimuth sensor and an inclination angle sensor can be separately used as in the second embodiment, an existing inclination sensor (or an acceleration sensor, a gyro sensor, or the like instead of the inclination angle sensor) can be used to detect azimuths.

According to an arrangement of the present invention, which has two focusing optical systems, there is provided an inexpensive optical angle detection apparatus for detecting a rotation angle in one axial direction in a predetermined coordinate system on the basis of an output from one one-dimensional position sensor, and a rotation angle in another axial direction on the basis of an output from another one-dimensional position sensor, thereby obtaining rotation angles in two axial directions in the predetermined coordinate system.

According to another arrangement of the present invention, there is provided an inexpensive optical angle detection apparatus for calculating a rotation angle in one axial direction in a predetermined coordinate system, e.g., the angle of a light source means relative to a sensor section around the axis determined by the light source means or the sensor section, on the basis of an output from a photosensor which varies depending on one of the above three or more polarized light sources from which a light beam is incident.

According to still another arrangement of the present invention, there is provided an inexpensive optical angle detection apparatus for detecting a rotation angle in one axial direction in a predetermined coordinate system, e.g., the angle of a light source means relative to a sensor section around the axis determined by the light source means or the sensor section, on the basis of an output from the above two-dimensional position sensor which varies depending on one of the above three or more polarized light sources from which a light beam is incident, and also detecting rotation angles in two axial directions in the predetermined coordinate system, e.g., the inclination angles of the sensor section in two axial directions with respect to the optical axis of a light source means, on the basis of at least one of two-dimensional position sensor outputs corresponding to the coordinates of the incident spots of light beams from the above three or more polarized light sources.

According to still another arrangement of the present invention, there is provided an inexpensive optical angle detection apparatus for detecting a rotation angle in one axial direction in a predetermine coordinate system, e.g., the rotation angle of a sensor section around the optical axis of the polarized light or the axis determined by the sensor section, on the basis of an output from each of the photosensors.

According to still another arrangement of the present invention, there is provided an inexpensive optical angle detection apparatus for detecting the angle of a light source means relative to a sensor section around the axis determined by the light source means or the sensor section on the basis of an output from a photosensor which changes with time.

Additional embodiments of the present invention will be apparent to those skilled in the art from consideration of the specification and practice of the present invention disclosed herein. It is intended that the specification and examples be considered as exemplary only with the true scope of the present invention being indicated by the following claims.

What is claimed is:

1. An optical angle detection apparatus comprising:
a light source for emitting polarized light;
a liquid crystal member for changing a polarizing direction of said polarized light emitted by said light source by a predetermined angle;
a sensor section spaced apart from said liquid crystal member, said sensor section including a polarizing member for polarizing a light beam transmitted through said liquid crystal member, and a photosensor integrally fixed to said polarizing member; and
a control mechanism for applying a predetermined voltage, which changes with time, to said liquid crystal member.

2. An optical angle detection apparatus comprising:
a light source section disposed on one of a stationary side and a movable side of an object for projecting a polarized light beam;
a sensor section disposed opposite to said light source section on the other one of said stationary side and said movable side of the object for receiving said polarized light beam and for producing outputs in response to reception of said light beam; and
a calculation section for calculating back-and-forth and lateral inclination angles of a relative attitude of the object and for simultaneously calculating a rotation angle in a horizontal direction based on said outputs of said sensor section.

3. The optical angle detection apparatus according to claim 2, wherein said light source section comprises a plurality of light projecting blocks for sequentially and periodically emitting differently polarized light beams.

4. The optical angle detection apparatus according to claim 3, wherein each of said light projecting blocks comprises a light source and a corresponding polarizing plate having a predetermined individual axis of polarization.

5. The optical angle detection apparatus according to claim 2, wherein said sensor section comprises a polarizing plate having a predetermined axis of polarization for restrictively receiving said light beam projected by said light source section, and a two-dimensional sensor for detecting a position of a light spot projected thereon through said polarizing plate.

6. The optical angle detection apparatus according to claim 2, wherein said light source section comprises a light source element and a polarizing plate having a predetermined axis of polarization.

7. The optical angle detection apparatus according to claim 2, wherein said sensor section comprises:

a first sensor including a plurality of polarizing plates each for restrictively receiving said light beam projected by said light source section and corresponding photosensors; and a second, two-dimensional sensor for detecting a position of a light spot projected thereon through a lens.

8. An optical angle detection apparatus comprising:

a light source for emitting polarized light;

a light source section having rotating means for changing a polarizing direction of said polarized light emitted by said light source by a predetermined angle;

a sensor section spaced apart from said light source section, said sensor section including a polarizing member for polarizing a light beam transmitted through said light source section, and a photosensor integrally fixed to said polarizing member; and a control section for applying a predetermined voltage, which changes with time, to said rotating means.

* * * * *